(12) United States Patent
Hong et al.

(10) Patent No.: US 11,755,074 B2
(45) Date of Patent: Sep. 12, 2023

(54) DISPLAY DEVICE AND METHOD OF MANUFACTURING SUPPORTING PART

(71) Applicants: Samsung Display Co., Ltd., Yongin-Si (KR); FINE DNC CO., LTD, Seoul (KR)

(72) Inventors: Sung Chun Hong, Asan-si (KR); Tae-Chang Kim, Anyang-si (KR); Sungsang Ahn, Hwaseong-si (KR); Byoungsu Lee, Hwaseong-si (KR); Taehyeog Jung, Hwaseong-si (KR)

(73) Assignees: SAMSUNG DISPLAY CO., LTD., Gyeonggi-Do (KR); FINE DNC CO., LTD, Seoul (KR)

( * ) Notice: Subject to any disclaimer, the term of this patent is extended or adjusted under 35 U.S.C. 154(b) by 191 days.

(21) Appl. No.: 17/115,224

(22) Filed: Dec. 8, 2020

(65) Prior Publication Data
US 2021/0200273 A1   Jul. 1, 2021

(30) Foreign Application Priority Data
Dec. 26, 2019   (KR) .................. 10-2019-0175225

(51) Int. Cl.
*G06F 1/16*   (2006.01)
*H04M 1/02*   (2006.01)

(52) U.S. Cl.
CPC ........ *G06F 1/1656* (2013.01); *H04M 1/0268* (2013.01)

(58) Field of Classification Search
CPC .... G06F 1/1615; G06F 1/1624; G06F 1/1633; G06F 1/1652; G06F 1/1656
See application file for complete search history.

(56) References Cited

U.S. PATENT DOCUMENTS

| 9,823,699 B2 | 11/2017 | Ko et al. |
| 10,175,792 B2 | 1/2019 | Kim et al. |
| 10,314,184 B2 | 6/2019 | Choi et al. |
| 10,347,852 B2 | 7/2019 | Myeong et al. |

(Continued)

FOREIGN PATENT DOCUMENTS

| EP | 3547101 A1 | 10/2019 |
| KR | 1020160000109 A | 1/2016 |

(Continued)

*Primary Examiner* — Anthony Q Edwards
(74) *Attorney, Agent, or Firm* — CANTOR COLBURN LLP

(57) ABSTRACT

A display device includes a display module, a supporting plate disposed under the display module, supporting bars disposed under the display module and arranged in a first direction with the supporting plate, a supporting film disposed between the display module and the supporting plate and between the display module and the supporting bars, a first case accommodating the display module, the supporting plate, the supporting film, and the supporting bars, and a second case coupled to the first case to move in a direction to be close to or to be far away from the first case along the first direction. Opposite sides of the supporting bars are respectively inserted into first guide grooves defined in inner side surfaces of the first case, which face each other in a second direction crossing the first direction, and the supporting bars move along the first guide groove.

17 Claims, 23 Drawing Sheets

(56) References Cited

U.S. PATENT DOCUMENTS

| | | | |
|---|---|---|---|
| 2004/0183958 A1* | 9/2004 | Akiyama | G09F 9/30 |
| | | | 349/58 |
| 2013/0058063 A1* | 3/2013 | O'Brien | G06F 1/1624 |
| | | | 361/807 |
| 2016/0081204 A1 | 3/2016 | Park et al. | |
| 2018/0103550 A1* | 4/2018 | Seo | G06F 1/1601 |
| 2019/0082544 A1 | 3/2019 | Park | |
| 2020/0249722 A1* | 8/2020 | Cha | G06F 1/1681 |
| 2020/0264660 A1* | 8/2020 | Song | G06F 1/1624 |
| 2020/0313112 A1* | 10/2020 | Lee | G06F 1/203 |
| 2020/0314225 A1* | 10/2020 | Ahn | G06F 1/1637 |
| 2020/0315036 A1* | 10/2020 | Ahn | H04M 1/0268 |
| 2021/0219437 A1* | 7/2021 | Kim | H04M 1/026 |
| 2022/0322550 A1* | 10/2022 | Yin | G06F 1/1637 |

FOREIGN PATENT DOCUMENTS

| | | |
|---|---|---|
| KR | 1020160031363 A | 3/2016 |
| KR | 1020160098677 A | 8/2016 |
| KR | 1020160141255 A | 12/2016 |
| KR | 1020170057500 A | 5/2017 |
| KR | 1020180049856 A | 5/2018 |
| KR | 1020180056444 A | 5/2018 |

\* cited by examiner

US 11,755,074 B2

DISPLAY DEVICE AND METHOD OF MANUFACTURING SUPPORTING PART

This application claims priority to Korean Patent Application No. 10-2019-0175225, filed on Dec. 26, 2019, and all the benefits accruing therefrom under 35 U.S.C. § 119, the content of which in its entirety is herein incorporated by reference.

BACKGROUND

1. Field

Embodiments of the invention relate to a display device and a method of manufacturing a supporting part. More particularly, embodiments of the invention relate to a display device capable of improving a surface quality of a display module and a method of manufacturing a supporting part.

2. Description of the Related Art

Electronic devices that provide an image to a user, such as a smart phone, a digital camera, a notebook computer, a navigation unit, and a smart television, include a display device to display the image. The display device generates the image and provides the image to the user through a display screen thereof.

In recent years, with the technological development for the display device, various types of display devices are being developed. Various flexible display devices, which are foldable, rollable, or transformable into a curved shape, are being developed. The flexible display devices are easy to carry, and thereby improve a user's convenience.

The flexible display device includes a flexible display module. The display module is accommodated in a case and is expanded after being withdrawn from the case as necessary. A supporting part is attached to a rear surface of the display module to support the display module withdrawn to the outside.

SUMMARY

Embodiments of the invention provide a display device capable of improving a surface quality of a display module.

Embodiments of the invention provide a method of manufacturing a supporting part.

An embodiment of the invention provides a display device including a display module, a supporting plate disposed under the display module, a plurality of supporting bars disposed under the display module and arranged in a first direction with the supporting plate, a supporting film disposed between the display module and the supporting plate and between the display module and the plurality of supporting bars, a first case accommodating the display module, the supporting plate, the supporting film, and the plurality of supporting bars, and a second case which is coupled to the first case and moves along the first direction. Opposite sides of the plurality of supporting bars are respectively inserted into first guide grooves defined in inner side surfaces of the first case, which face each other in a second direction crossing the first direction, and the plurality of supporting bars moves along the first guide grooves.

An embodiment of the invention provides a method of manufacturing a supporting part including preparing a metal plate including a sub-supporting plate, defining first grooves, which are arranged in a first direction, extend in a second direction crossing the first direction, and are spaced apart from opposite sides of the sub-supporting plate, which are opposite to each other in the second direction, in an upper surface of the sub-supporting plate, defining second grooves, which are arranged in the first direction, extend in the second direction, overlap the first grooves, and are spaced apart from the opposite sides of the sub-supporting plate, from a lower surface of the sub-supporting plate to the first grooves, separating supporting bars between openings defined by the first and second grooves from the sub-supporting plate, and providing a supporting film on the supporting bars. Each of the second grooves is greater than each of the first grooves.

An embodiment of the invention provides a method of manufacturing a supporting part including preparing a metal plate including a first supporting plate, a second supporting plate, and a sub-supporting plate, which are arranged in a first direction, defining first grooves arranged in the first direction and extending to opposite sides of the sub-supporting plate in a second direction crossing the first direction in an upper surface of the sub-supporting plate, providing a supporting layer on the upper surface of the sub-supporting plate and the first grooves, and defining second grooves, which are arranged in the first direction, extend to the opposite sides of the sub-supporting plate in the second direction, and overlap the first grooves, from a lower surface of the sub-supporting plate to the first grooves to define a plurality of supporting bars between the first grooves and between the second grooves. Each of the second grooves is greater than each of the first grooves.

According to the above, the supporting film that is flat is disposed on the supporting bars that support the display module, and the display module is disposed on the flat supporting film. Thus, the surface quality of the display module may be improved.

BRIEF DESCRIPTION OF THE DRAWINGS

The above and other advantages of the invention will become readily apparent by reference to the following detailed description when considered in conjunction with the accompanying drawings, in which.

DETAILED DESCRIPTION

Figure 1:
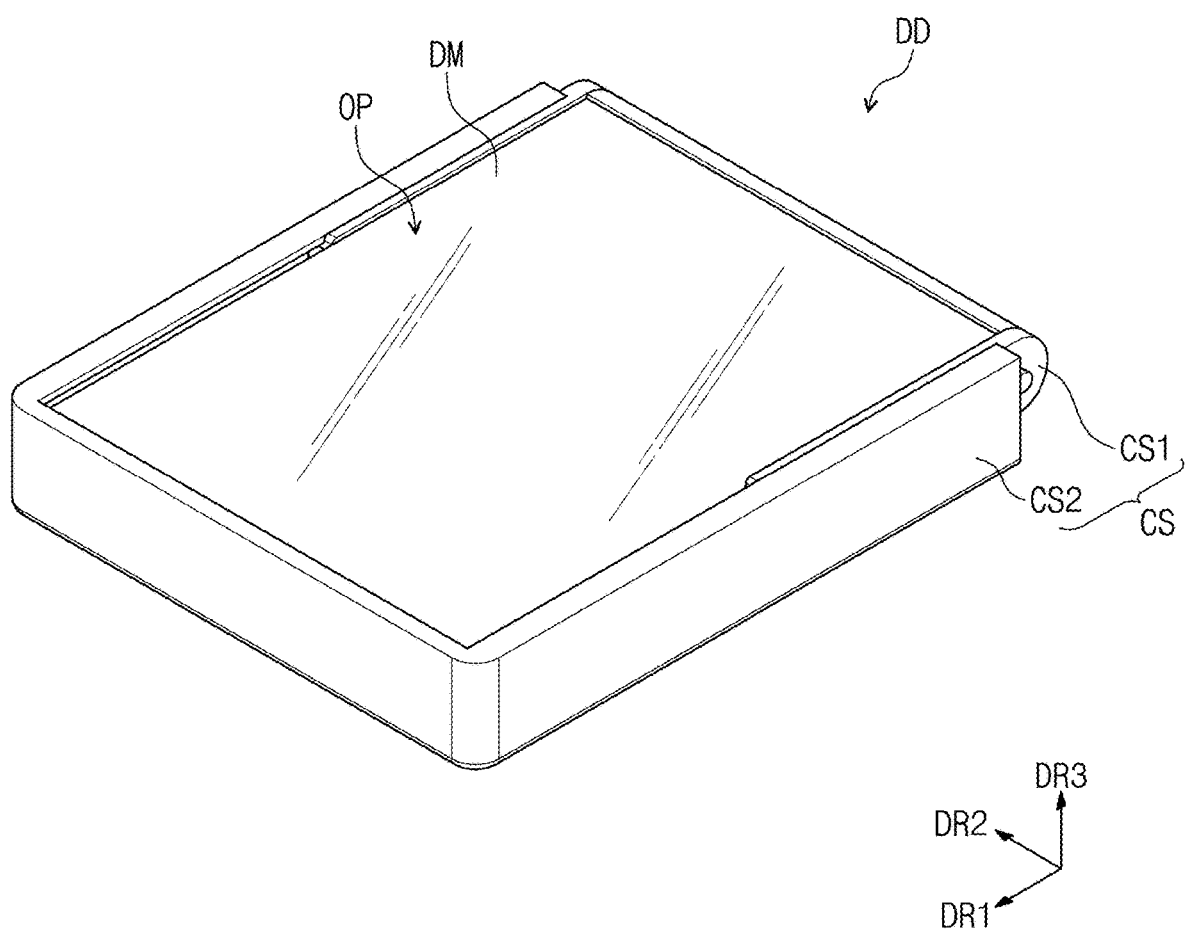
FIG. 1 is a perspective view showing an embodiment of a display device according to the invention.

In the present disclosure, it will be understood that when an element or layer is referred to as being "on", "connected to" or "coupled to" another element or layer, it can be directly on, connected or coupled to the other element or layer or intervening elements or layers may be present.

Like numerals refer to like elements throughout. In the drawings, the thickness, ratio, and dimension of components are exaggerated for effective description of the technical content.

As used herein, the term "and/or" includes any and all combinations of one or more of the associated listed items.

It will be understood that, although the terms first, second, etc. may be used herein to describe various elements, these elements should not be limited by these terms. These terms are only used to distinguish one element from another element. Thus, a first element discussed below could be termed a second element without departing from the teachings of the disclosure. As used herein, the singular forms, "a", "an" and "the" are intended to include the plural forms as well, unless the context clearly indicates otherwise.

Spatially relative terms, such as "beneath", "below", "lower", "above", "upper" and the like, may be used herein for ease of description to describe one element or feature's relationship to another element(s) or feature(s) as illustrated in the drawing figures.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Hereinafter, the invention will be explained in detail with reference to the accompanying drawings.

Figure 2:
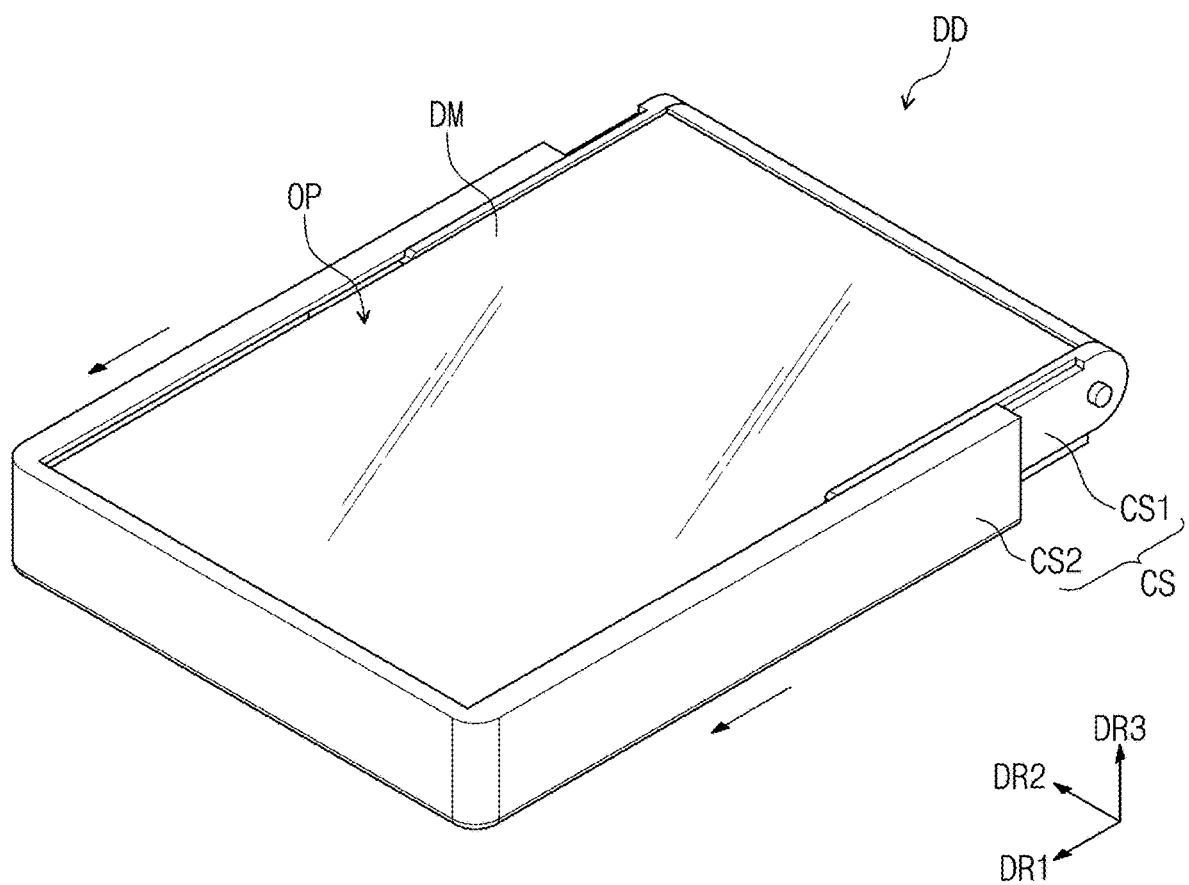
FIG. 2 is a perspective view showing an expanding mode of the display device shown in FIG. 1.

FIG. 1 is a perspective view showing an embodiment of a display device DD according to the invention. FIG. 2 is a perspective view showing an expanding mode of the display device DD shown in FIG. 1.

Referring to FIG. 1, the display device DD in the embodiment of the invention may include a display module DM and a case CS in which the display module DM is accommodated. The display module DM may be exposed to the outside through an opening OP defined through the case CS.

The case CS may include a first case CS1 and a second case CS2 coupled to the first case CS1 to accommodate the display module DM. The second case CS2 may be coupled to the first case CS1 to move in a first direction DR1. Configurations of the first and second cases CS1 and CS2 will be described in more detail below.

A direction crossing the first direction DR1 may be also referred to as a "second direction DR2", and a direction perpendicularly crossing a plane defined by the first and second directions DR1 and DR2 may be also referred to as a "third direction DR3". In the invention, the expression "a plan view" may mean a view in the third direction DR3.

Referring to FIGS. 1 and 2, the second case CS2 may move in the first direction DR1 to be close to or far away from the first case CS1. When the second case CS2 moves in the first direction DR1, an area of the exposed surface of the display module DM may be adjusted according to the movement of the second case CS2. As the second case CS2 moves, both a basic mode and the expanding mode of the display device DD may be implemented.

In an embodiment, the display module DM may be a flexible display module and may be supported by a supporting part disposed thereunder, for example. Configurations of the supporting part will be described in detail below. The supporting part may be connected to the second case CS2, and when the second case CS2 moves in the first direction DR1 to be far away from the first case CS1, the supporting part may also move in the first direction DR1 to be far away from the first case CS1.

Although not shown in drawing figures, a portion of the display module DM, which is not exposed to the outside, may be disposed in the first case CS1 in addition to a portion of the display module DM, which is exposed to the opening OP. The display module DM disposed on the supporting part may move in the first direction DR1 together with the supporting part as the second case CS2 moves, and as a result, the exposed surface of the display module DM may be expanded.

As the exposed surface of the display module DM may be expanded, a user may view an image through a larger screen. A state in which the exposed surface of the display module DM of the display device DD is expanded may be also referred to as the "expanding mode".

As shown in FIG. 1, when the first case CS1 and the second case CS2 are coupled to be close to each other, the exposed surface of the display module DM may be minimized. In an embodiment, when the second case CS2 moves in the first direction DR1 to be close to the first case CS1, the first case CS1 and the second case CS2 may be adjacent to each other as shown in FIG. 1. This state of the display device DD may be also referred to as the "basic mode", for example.

Figure 3:
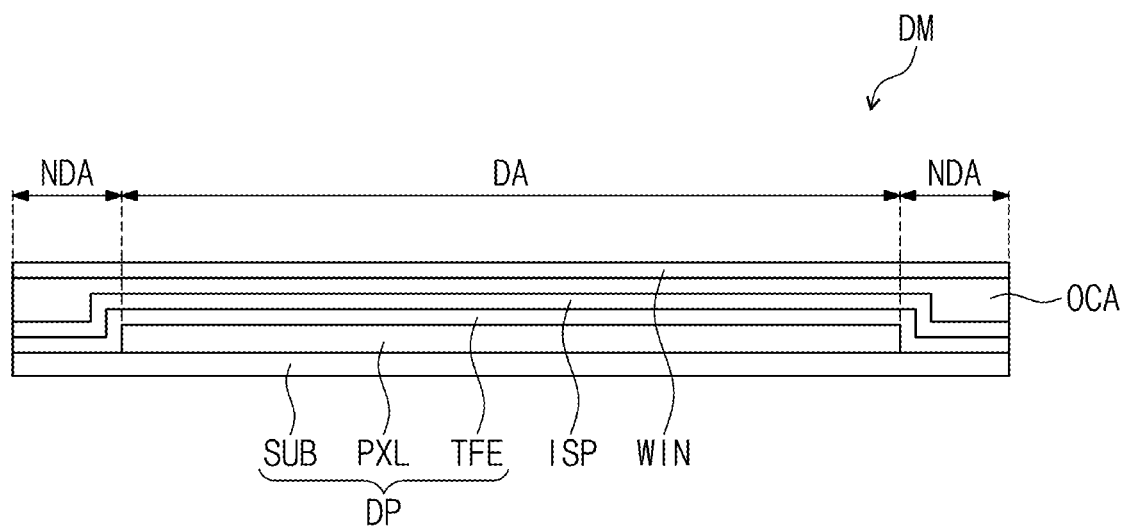
FIG. 3 is a cross-sectional view schematically showing a display module shown in FIG. 1.

FIG. 3 is a cross-sectional view schematically showing the display module DM shown in FIG. 1.

Referring to FIG. 3, the display module DM may include a display panel DP, an input sensing part ISP disposed on the display panel DP, a window WIN disposed on the input sensing part ISP, and an adhesive OCA disposed between the window WIN and the input sensing part ISP.

The display panel DP in the embodiment of the invention may be a light-emitting type display panel, however, it should not be limited thereto or thereby. Various display panels, such as a liquid crystal display panel, an electrowetting display panel, an electrophoretic display panel, etc., which may display the image, may be used as the display panel DP. The display panel DP may be a flexible display panel.

The display panel DP in the embodiment of the invention may be the light-emitting type display panel, however, it should not be particularly limited. In an embodiment, the display panel DP may be an organic light emitting display panel or a quantum dot light emitting display panel, for example. A light emitting layer of the organic light emitting display panel may include an organic light emitting material. In an embodiment, a light emitting layer of the quantum dot light emitting display panel may include at least one of a quantum dot and a quantum rod. Hereinafter, the organic light emitting display panel will be described as the display panel DP.

The display panel DP may include a substrate SUB, a pixel layer PXL disposed on the substrate SUB, and a thin film encapsulation layer TFE disposed on the substrate SUB to cover the pixel layer PXL. The substrate SUB may be a transparent substrate and may include a flexible plastic substrate. In an embodiment, the substrate SUB may include polyimide (PI), for example.

The substrate SUB may include a display area DA and a non-display area NDA around the display area DA. The pixel layer PXL may be disposed on the display area DA. The pixel layer PXL may include a plurality of pixels, and each pixel may include a light emitting element.

The thin film encapsulation layer TFE may include at least two inorganic layers and an organic layer disposed between the inorganic layers. The inorganic layers may include an inorganic material and may protect the pixel layer PXL from moisture and oxygen. The organic layer may include an organic material and may protect the pixel layer PXL from a foreign substance, such as dust particles.

The input sensing part ISP may be disposed on the thin film encapsulation layer TFE. The input sensing part ISP may sense an external input by an input medium such as a user's hand or a touch pen, and may convert the sensed input to a predetermined input signal. The input sensing part ISP may include a plurality of sensing electrodes to sense the external input. The sensing electrodes may sense the external input by a capacitive method.

The input sensing part ISP may be manufactured directly on the thin film encapsulation layer TFE when manufacturing the display module DM, however, it should not be limited thereto or thereby. The input sensing part ISP may be manufactured as a touch panel separately from the display panel DP and then may be attached to the display panel DP by an adhesive.

The window WIN may protect the display panel DP and the input sensing part ISP from external scratches and impacts. The window WIN may be attached to the input sensing part ISP by the adhesive OCA. In an embodiment, the adhesive OCA may include an optically clear adhesive, for example. The image generated by the display panel DP may be provided to the user after passing through the window WIN.

Figure 4:
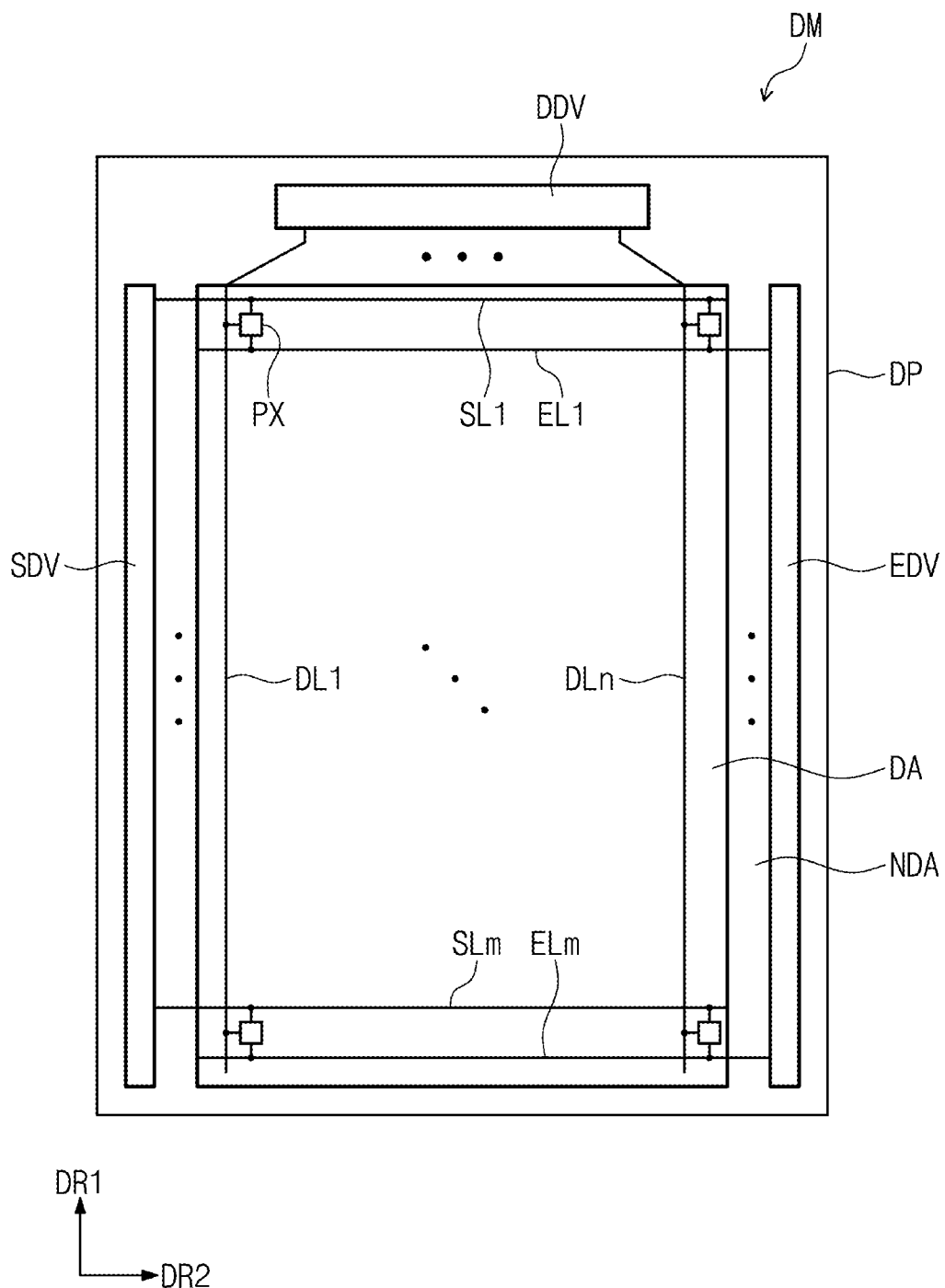
FIG. 4 is a plan view showing the display module shown in FIG. 3.

FIG. 4 is a plan view showing the display module DM shown in FIG. 3.

Referring to FIG. 4, the display module DM may include the display panel DP, a scan driver SDV, a data driver DDV, and an emission driver EDV. FIG. 4 shows a configuration of the display panel DP in a plan view, and the planar configuration of the input sensing part ISP is omitted.

The display panel DP may have a quadrangular (e.g., rectangular) shape having long sides extending in the first direction DR1 and short sides extending in the second direction DR2. The display panel DP may include the plane defined by the first and second directions DR1 and DR2. The display panel DP may include a display area DA and a non-display area NDA surrounding the display area DA.

The display panel DP may include a plurality of pixels PX, a plurality of scan lines SL1 to SLm, a plurality of data lines DL1 to DLn, and a plurality of emission lines EL1 to ELm. Each of "m" and "n" is a natural number. The pixels PX may be arranged in the display area DA and may be connected to the scan lines SL1 to SLM, the data lines DL1 to DLn, and the emission lines EL1 to ELm.

The scan driver SDV, the data driver DDV, and the emission driver EDV may be arranged in the non-display area NDA. The scan driver SDV may be disposed in the non-display area NDA adjacent to one side (e.g., left side in FIG. 4) of the display panel DP, which is defined by one long side of the long sides of the display panel DP.

The emission driver EDV may be disposed in the non-display area NDA adjacent to another side (e.g., right side in FIG. 4) of the display panel DP, which is opposite to the one side of the display panel DP. The data driver DDV may be disposed in the non-display area NDA adjacent to one short side (e.g., upper side in FIG. 4) of the short sides (e.g., upper and lower sides in FIG. 4) of the display panel DP after being manufactured in an integrated circuit chip form.

The scan lines SL1 to SLm may extend in the second direction DR2 and may be connected to the scan driver SDV. The data lines DL1 to DLn may extend in the first direction DR1 and may be connected to the data driver DDV. The emission lines EL1 to ELm may extend in the second direction DR2 and may be connected to the emission driver EDV.

The scan driver SDV may generate a plurality of scan signals, and the scan signals may be applied to the pixels PX through the scan lines SL1 to SLm. The scan signals may be sequentially applied to the pixels PX. The data driver DDV may generate a plurality of data voltages, and the data voltages may be applied to the pixels PX through the data lines DL1 to DLn. The emission driver EDV may generate a plurality of light emitting signals, and the light emitting signals may be applied to the pixels PX through the emission lines EL1 to ELm.

Although not shown in drawing figures, the display module DM may include a timing controller (not shown) to control an operation of the scan driver SDV, the data driver DDV, and the emission driver EDV.

The timing controller may generate a scan control signal, a data control signal, and a light emitting control signal in response to control signals provided from the outside. The timing controller may receive image signals from the outside, may convert a data format of the image signals to a data format appropriate to an interface between the data driver DDV and the timing controller, and may provide the image signals to the data driver DDV.

The scan driver SDV may generate the scan signals in response to the scan control signal, and the emission driver EDV may generate the light emitting signals in response to the light emitting control signal. The data driver DDV may receive the image signals of which data format is converted and may generate the data voltages corresponding to the image signals.

The pixels PX may receive the data voltages in response to the scan signals. The pixels PX may emit light having luminance corresponding to the data voltages in response to the light emitting signals to display the image. A light emitting time of the pixels PX may be controlled by the light emitting signals.

Figure 5:
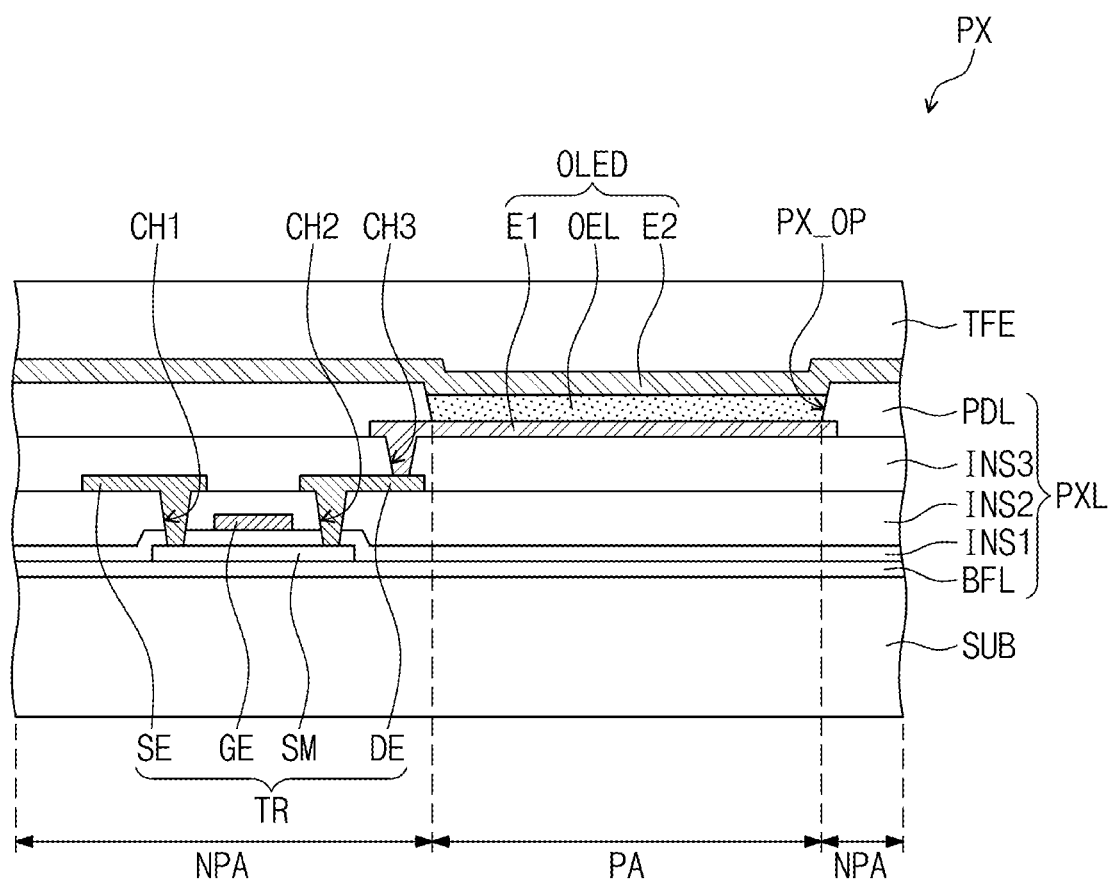
FIG. 5 is a cross-sectional view schematically showing one pixel shown in FIG. 4.

FIG. 5 is a cross-sectional view schematically showing one pixel PX shown in FIG. 4.

Referring to FIG. 5, the pixel PX may include an organic light emitting device OLED and a transistor TR connected to the organic light emitting device OLED. The organic light emitting device OLED may include a first electrode E1, a second electrode E2, and an organic light emitting layer OEL disposed between the first electrode E1 and the second electrode E2. In an embodiment, the first electrode E1 may be an anode electrode, and the second electrode E2 may be a cathode electrode, but are not limited thereto.

The pixel PX may include a pixel area PA and a non-pixel area NPA around the pixel area PA. The organic light emitting device OLED may be disposed in the pixel area PA, and the transistor TR may be disposed in the non-pixel area NPA.

The transistor TR and the organic light emitting device OLED may be disposed on the substrate SUB. A buffer layer BFL may be disposed on the substrate SUB, and the buffer layer BFL may include an inorganic material. A semiconductor layer SM of the transistor TR may be disposed on the buffer layer BFL, and the buffer layer BFL may include an inorganic material. The semiconductor layer SM of the transistor may be disposed on the buffer layer BFL. In an embodiment, the semiconductor layer SM may include an inorganic semiconductor, such as amorphous silicon or polycrystalline silicon, or an organic semiconductor. In addition, the semiconductor layer SM may include an oxide semiconductor, for example, but is not limited thereto.

Although not shown in FIG. 5, the semiconductor layer SM may include a source area, a drain area, and a channel area defined between the source area and the drain area.

A first insulating layer INS1 may be disposed on the buffer layer BFL to cover the semiconductor layer SM. The first insulating layer INS1 may include an inorganic material. A gate electrode GE of the transistor TR may be disposed on the first insulating layer INS1 to overlap the semiconductor layer SM. The gate electrode GE may overlap the channel area of the semiconductor layer SM.

A second insulating layer INS2 may be disposed on the first insulating layer INS1 to cover the gate electrode GE. The second insulating layer INS2 may be also referred to as an "inter-insulating layer". The second insulating layer INS2 may include an organic material and/or an inorganic material.

A source electrode SE and a drain electrode DE of the transistor TR may be disposed on the second insulating layer INS2 to be spaced apart from each other. The source electrode SE may be connected to the source area of the semiconductor layer SM through a first contact hole CH1 defined through the first insulating layer INS1 and the second insulating layer INS2. The drain electrode DE may be connected to the drain area of the semiconductor layer SM through a second contact hole CH2 defined through the first insulating layer INS1 and the second insulating layer INS2.

A third insulating layer INS3 may be disposed on the second insulating layer INS2 to cover the source electrode SE and the drain electrode DE of the transistor TR. The third insulating layer INS3 may be also referred to as a "planarization layer" that provides a flat upper surface and may include an organic material.

The first electrode E1 may be disposed on the third insulating layer INS3. The first electrode E1 may be connected to the drain electrode DE of the transistor TR through a third contact hole CH3 defined through the third insulating layer INS3. The first electrode E1 may be also referred to as a "pixel electrode".

A pixel definition layer PDL may be disposed on the first electrode E1 and the third insulating layer INS3 to expose a predetermined portion of the first electrode E1. An opening PX_OP may be defined through the pixel definition layer PDL to expose the predetermined portion of the first electrode E1.

The organic light emitting layer OEL may be disposed on the first electrode E1 in the opening PX_OP. In an embodiment, the organic light emitting layer OEL may generate a light having one of red, green, and blue colors, however, it should not be limited thereto or thereby. In an embodiment, the organic light emitting layer OEL may generate a white light by a combination of organic materials respectively generating the red, green, and blue colors, for example.

The second electrode E2 may be disposed on the pixel definition layer PDL and the organic light emitting layer OEL. The second electrode E2 may be also referred to as a "common electrode".

The thin film encapsulation layer TFE may be disposed on the organic light emitting device OLED to cover the pixel PX. A layer disposed between the substrate SUB and the thin film encapsulation layer TFE may be also referred to as the "pixel layer PXL".

A first voltage may be applied to the first electrode E1, and a second voltage may be applied to the second electrode E2. Holes and electrons injected into the organic light emitting layer OEL may be recombined to generate excitons, and the organic light emitting device OLED may emit the light by the excitons that return to a ground state from an excited state. In an embodiment, the organic light emitting device OLED may emit red, green, and blue lights in accordance with the current flow, for example, so that the image may be displayed.

Figure 6:
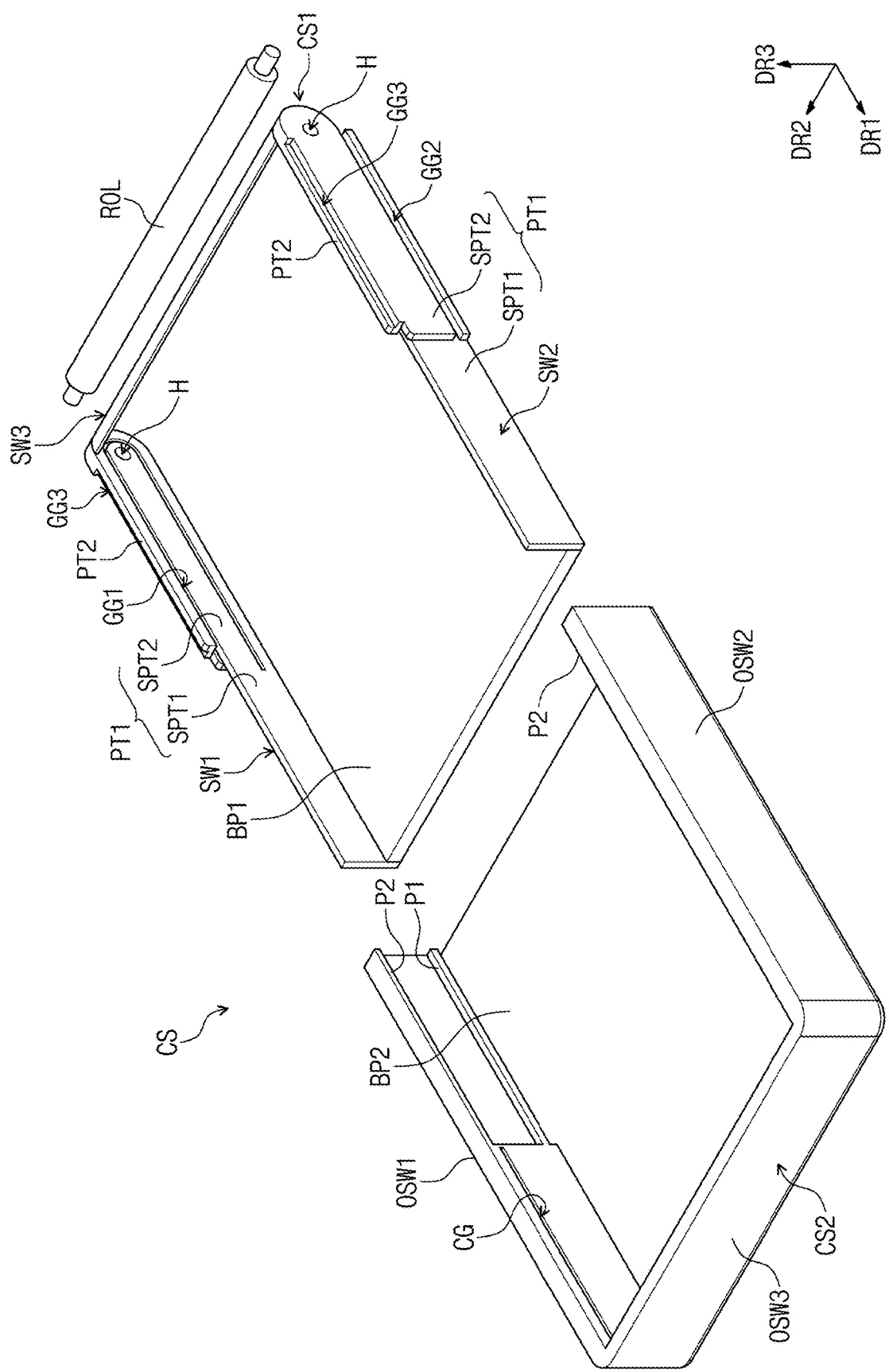
FIG. 6 is an exploded perspective view showing a case shown in FIG. 1.
Figure 7:
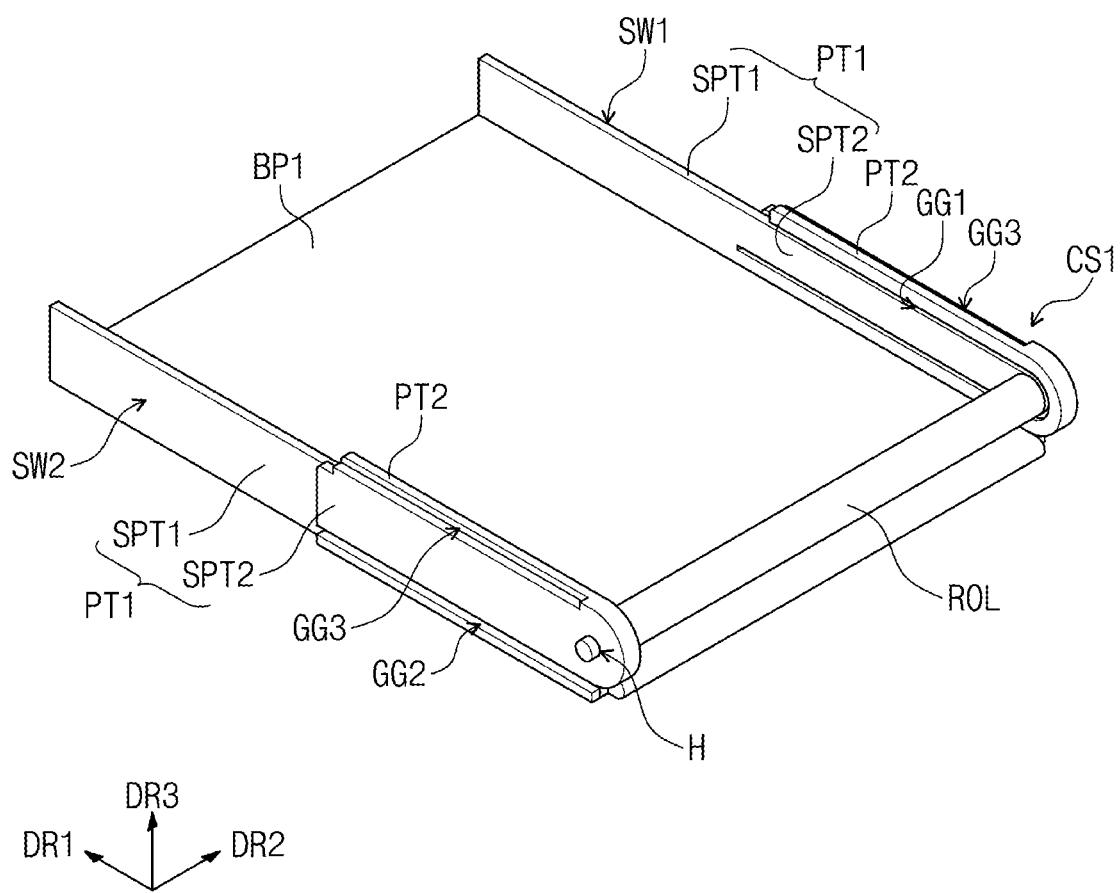
FIG. 7 is a perspective view showing a roller part disposed in a first case shown in FIG. 6.

FIG. 6 is an exploded perspective view showing the case CS shown in FIG. 1. FIG. 7 is a perspective view showing a roller part ROL disposed in the first case shown in FIG. 6.

In FIG. 7, a third sidewall SW3 is omitted to explain the roller part ROL.

Referring to FIG. 6, the case CS may include the first case CS1, the second case CS2, and the roller part ROL. The roller part ROL may be disposed in the first case CS1, and this structure will be described in detail with reference to FIG. 7.

The first case CS1 may include a first sidewall SW1, a second sidewall SW2, the third sidewall WS3, and a first bottom portion BP1. The first sidewall SW1 may include a plane defined by the first and third directions DR1 and DR3 and may extend longer in the first direction DR1 than in the third direction DR3.

The second sidewall SW2 may include a plane defined by the first and third directions DR1 and DR3 and may extend longer in the first direction DR1 than in the third direction DR3. The second sidewall SW2 may face the first sidewall SW1 in the second direction DR2.

The first sidewall SW1 and the second sidewall SW2 may have substantially the same shape. One side of the first sidewall SW1 and one side of the second sidewall SW2 may have a convex curved shape.

A first guide groove GG1 may be defined in each of an inner side surface of the first sidewall SW1 and an inner side surface of the second sidewall SW2, which face each other. The inner side surfaces of the first and second sidewalls SW1 and SW2 may define inner side surfaces of the first case CS1, which face each other in the second direction DR2.

In FIG. 6, the first guide groove GG1 defined in the inner side surface of the first sidewall SW1 is shown due to a viewing position of the perspective view, however, the first guide groove GG1 may also be defined in the inner side surface of the second sidewall SW2. In an embodiment, the first guide groove GG1 may have a shape obtained by rotating a "U" shape at about 90 degrees in a counter-clockwise direction, but is not limited thereto. The shape of the first guide groove GG1 will be described in detail below.

Hereinafter, a surface of the first sidewall SW1, which is opposite to the inner side surface of the first sidewall SW1, will be also referred to as an "outer side surface" of the first sidewall SW1. A surface of the second sidewall SW2, which is opposite to the inner side surface of the second sidewall SW2, will be also referred to as an "outer side surface" of the second sidewall SW2. In addition, inner and outer side surfaces of sub-elements of the first and second sidewalls SW1 and SW2, which will be described below, may respectively correspond to the inner and outer side surfaces of the first and second sidewalls SW1 and SW2.

A second guide groove GG2 may be defined in the outer side surface of each of the first and second sidewalls SW1 and SW2 and may extend in the first direction DR1. A third guide groove GG3 may be defined in an upper portion of each of the first and second sidewalls SW1 and SW2 and may extend in the first direction DR1. Due to the viewing point of the perspective view, the second guide groove GG2 and the third guide groove GG3 defined in the second sidewall SW2 are shown, however, the second guide groove GG2 and the third guide groove GG3 may also be defined in the first sidewall SW1.

Each of the first and second sidewalls SW1 and SW2 may include a first portion PT1 and a second portion PT2 disposed on a predetermined portion of the first portion PT1, which is adjacent to one side of the first portion PT1, and extending in the first direction DR1. The one side of the first portion PT1 may correspond to one side of each of the first and second sidewalls SW1 and SW2. A portion of the first guide groove GG1 may be defined between the first portion PT1 and the second portion PT2.

The first portion PT1 may include a first sub-portion SPT1 that does not overlap the second portion PT2 and a second sub-portion SPT2 that overlaps the second portion PT2 in the third direction DR3. The second sub-portion SPT2 may be disposed under the second portion PT2.

An inner side surface of the first sub-portion SPT1 and an inner side surface of the second sub-portion SPT2 may be disposed at the same plane. An outer side surface of the second sub-portion SPT2 may be disposed more outside than an outer side surface of the first sub-portion SPT1. That is, a thickness of the second sub-portion SPT2 in the second direction DR2 may be greater than a thickness of the first sub-portion SPT1 in the second direction DR2.

The second guide groove GG2 may be defined in the outer side surface of the second sub-portion SPT2. The second guide groove GG2 may be adjacent to a lower portion of the second sub-portion SPT2. The third guide groove GG3 may be defined in an upper portion of the second portion PT2. The third guide groove GG3 may be defined in the upper portion of the second portion PT2 adjacent to the outer side surface of the second portion PT2.

The third sidewall SW3 may be disposed between one side of the first sidewall SW1 and one side of the second sidewall SW2. The third sidewall SW3 may define one side of the opposite sides of first case CS1, which are opposite to each other in the first direction DR1. The second portion PT2 and the second sub-portion SPT2 may be adjacent to the third sidewall SW3.

The first bottom portion BP1 may include a plane defined by the first and second directions DR1 and DR2. The first bottom portion BP1 may be connected to lower portions of the first, second, and third sidewalls SW1, SW2, and SW3.

The second case CS2 may include a first outer sidewall OSW1, a second outer sidewall OSW2, a third outer sidewall OSW3, and a second bottom portion BP2. The first outer sidewall OSW1 may include a plane defined by the first and third directions DR1 and DR3 and may extend longer in the first direction DR1 than in the third direction DR3.

The second outer sidewall OSW2 may include a plane defined by the first and third directions DR1 and DR3 and may extend longer in the first direction DR1 than in the third direction DR3. The second outer sidewall OSW2 may face the first outer sidewall OSW1 in the second direction DR2. The first outer sidewall OSW1 and the second outer sidewall OSW2 may have substantially the same shape.

The second case CS2 may include a first protrusion P1 protruding from each of an inner side surface of the first outer sidewall OSW1 and an inner side surface of the second outer sidewall OSW2 and extending in the first direction DR1. The first protrusion P1 may extend in the first direction DR1 from each of one sides of the first and second outer sidewalls OSW1 and OSW2.

Due to the viewing position of the perspective view, the first protrusion P1 disposed on the inner side surface of the first outer sidewall OSW1 is shown in FIG. 6, however, the first protrusion P1 may also be disposed on the inner side surface of the second outer sidewall OSW2. The first protrusion P1 may be adjacent to a lower portion of each of the first and second outer sidewalls OSW1 and OSW2. Substantially, the first protrusion P1 may correspond to a position where the second guide groove GG2 is disposed.

The one sides of the first and second outer sidewalls OSW1 and OSW2 may be substantially defined as ends of the first and second outer sidewalls OSW1 and OSW2 adjacent to the one sides of the first and second sidewalls SW1 and SW2 when the first and second cases CS1 and CS2 are coupled to each other. Hereinafter, sides that are opposite to the one sides of the first and second outer sidewalls OSW1 and OSW2 are also referred to as "the other sides" of the first and second outer sidewalls OSW1 and OSW2.

The second case CS2 may include a second protrusion P2 protruding from each of an upper portion of the first outer sidewall OSW1 and an upper portion of the second outer sidewall OSW2 and extending in the first direction DR1. The second protrusion P2 may extend in the first direction DR1 from each of the one sides of the first and second outer sidewalls OSW1 and OSW2. The second protrusion P2 may correspond to a position where the third guide groove GG3 is disposed.

A connection groove CG may be defined in each of the inner side surface of the first outer sidewall OSW1 and the inner side surface of the second outer sidewall OSW2. The connection groove CG may be defined adjacent to the other side of each of the first and second outer sidewalls OSW1 and OSW2. Due to the viewing position of the perspective view, the connection groove CG defined in the inner side surface of the first outer sidewall OSW1 is shown in FIG. 6, however, the connection groove CG may also be defined in the inner side surface of the second outer sidewall OSW2. The inner side surfaces of the first and second outer sidewalls OSW1 and OSW2 may define the inner side surfaces of the second case CS2, which face each other in the second direction DR2.

The third outer sidewall OSW3 may face the third sidewall SW3 and may be disposed between the first outer sidewall OSW1 and the second outer sidewall OSW2. The third outer sidewall OSW3 may be disposed between the other side of the first outer sidewall OSW1 and the other side of the second outer sidewall OSW2.

The second bottom portion BP2 may include a plane defined by the first and second directions DR1 and DR2. The second bottom portion BP2 may be connected to the lower portions of the first, second, and third outer sidewalls OSW1, OSW2, and OSW3.

The roller part ROL may extend in the second direction DR2. The roller part ROL may have a cylindrical shape. The roller part ROL may rotate with reference to a central axis of the roller part ROL extending in the second direction DR2.

Referring to FIGS. 6 and 7, the roller part ROL may be disposed in the first case CS1. The roller part ROL may be disposed between the first sidewall SW1 and the second sidewall SW2. The roller part ROL may be adjacent to the one sides of the first and second sidewalls SW1 and SW2 (or the third sidewall SW3).

The roller part ROL may be connected to the first case CS1. In an embodiment, opposite ends of the roller part ROL, which are opposite to each other in the second direction DR2, may be respectively inserted into holes H defined in portions of the first and second sidewalls SW1 and SW2 adjacent to the one sides of the first and second sidewalls SW1 and SW2, for example.

Figure 8:
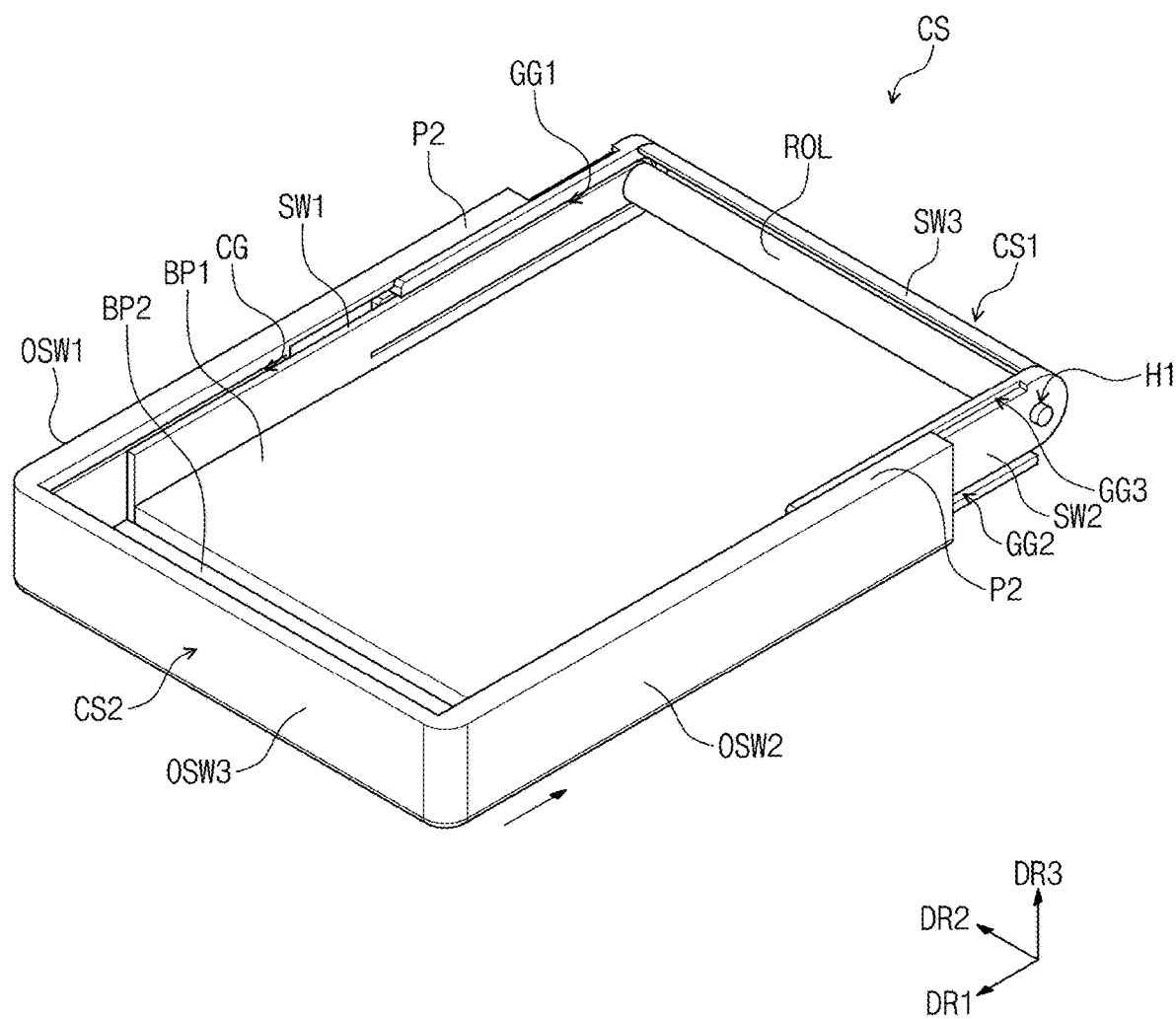
FIGS. 8 and 9 are perspective views showing a state in which a second case shown in FIG. 6 is coupled to the first case.
Figure 9:
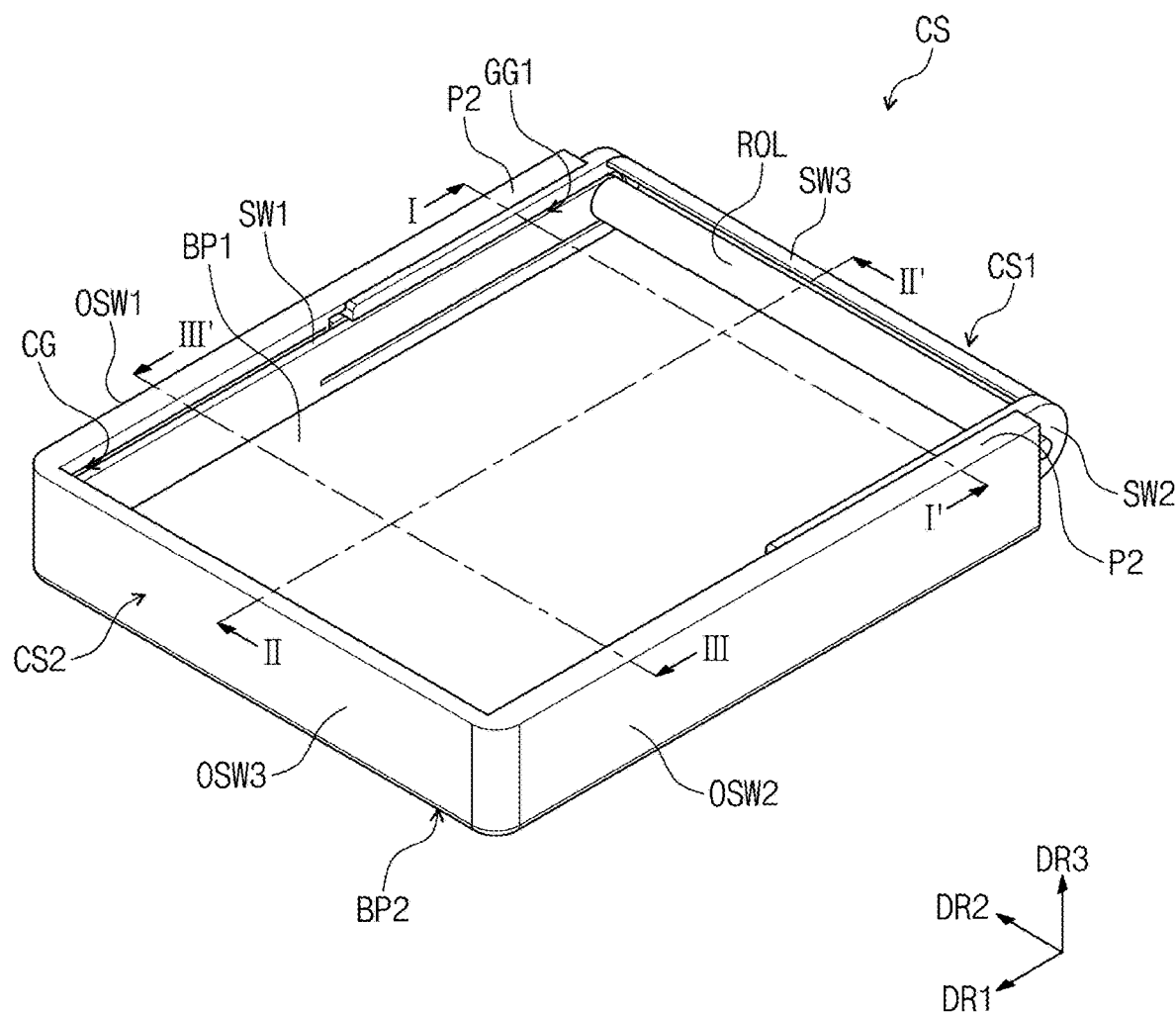

FIGS. 8 and 9 are perspective views showing a state in which the second case CS2 shown in FIG. 6 is coupled to the first case CS1.

Referring to FIGS. 8 and 9, the second case CS2 may be inserted into the second and third guide grooves GG2 and GG3 and may be coupled to the first case CS1. In an embodiment, the first protrusions P1 may be inserted into the second guide grooves GG2, the second protrusions P2 may be inserted into the third guide grooves GG3, and thus, the second case CS2 may be coupled to the first case CS1. This configuration will be described in detail with reference to FIG. 10, for example.

The first outer sidewall OSW1 may be disposed on the outer side surface of the first sidewall SW1, and the second outer sidewall OSW2 may be disposed on the outer side surface of the second sidewall SW2. The second bottom portion BP2 may be disposed under the first bottom portion BP1.

When the second case CS2 is coupled to the first case CS1, the one sides of the first and second outer sidewalls OSW1 and OSW2 may be adjacent to the one sides of the first and second sidewalls SW1 and SW2, and the other sides of the first and second outer sidewalls OSW1 and OSW2 may be adjacent to the other sides of the first and second sidewalls SW1 and SW2.

The one side of the second case CS2 may be adjacent to the one side of the first case CS1, and the other side of the second case CS2, which is opposite to the one side of the second case CS2, may be adjacent to the other side of the first case CS1. The other side of the second case CS2 may be defined by the third outer sidewall OSW3.

Figure 10:
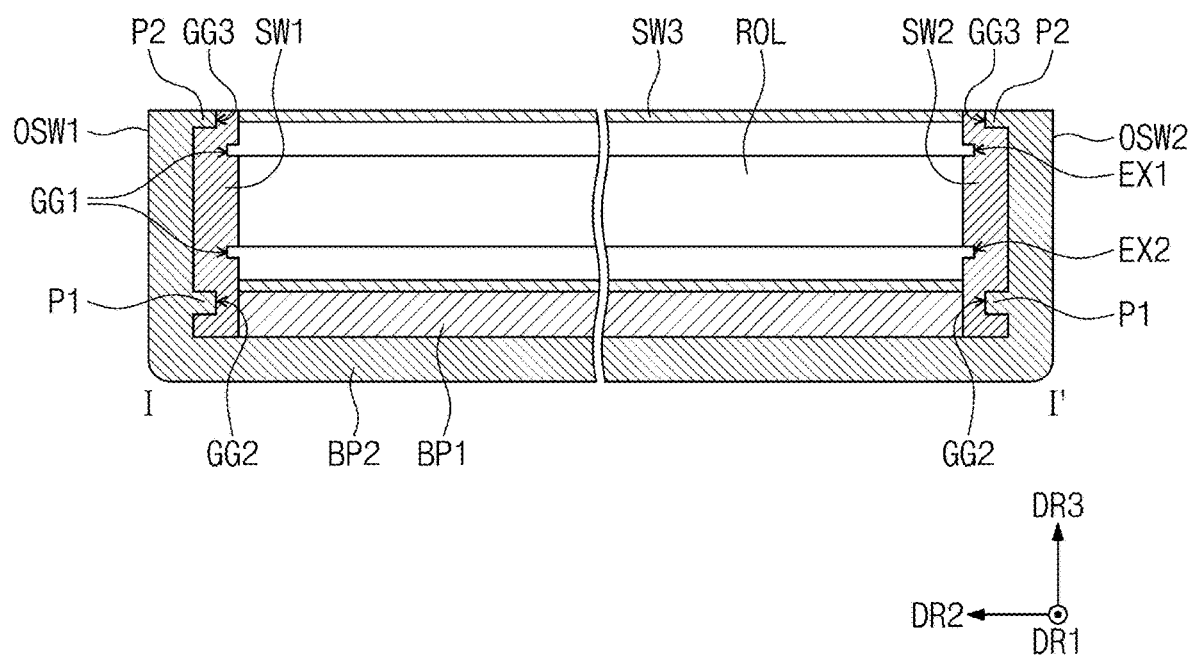
FIG. 10 is a cross-sectional view taken along line I-I' shown in FIG. 9.
Figure 11:
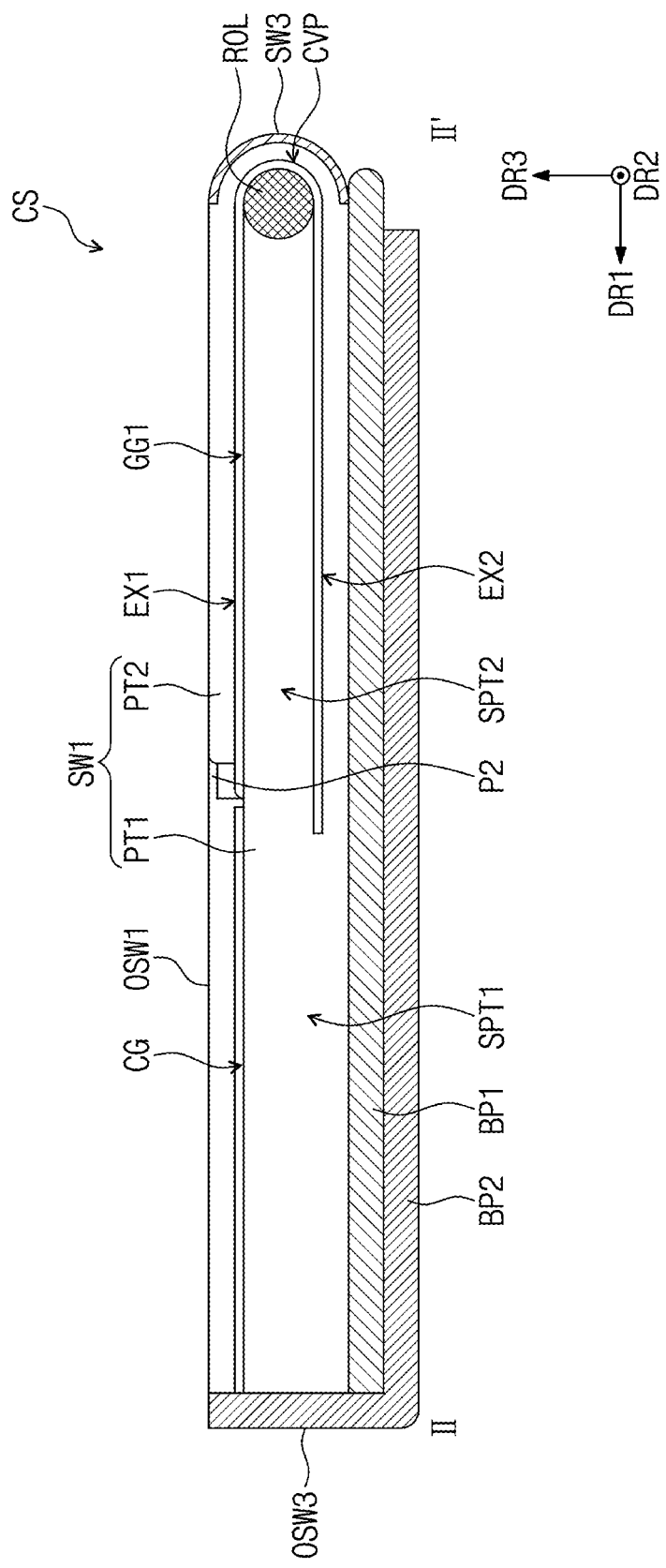
FIG. 11 is a cross-sectional view taken along line II-IF shown in FIG. 9.
Figure 12:
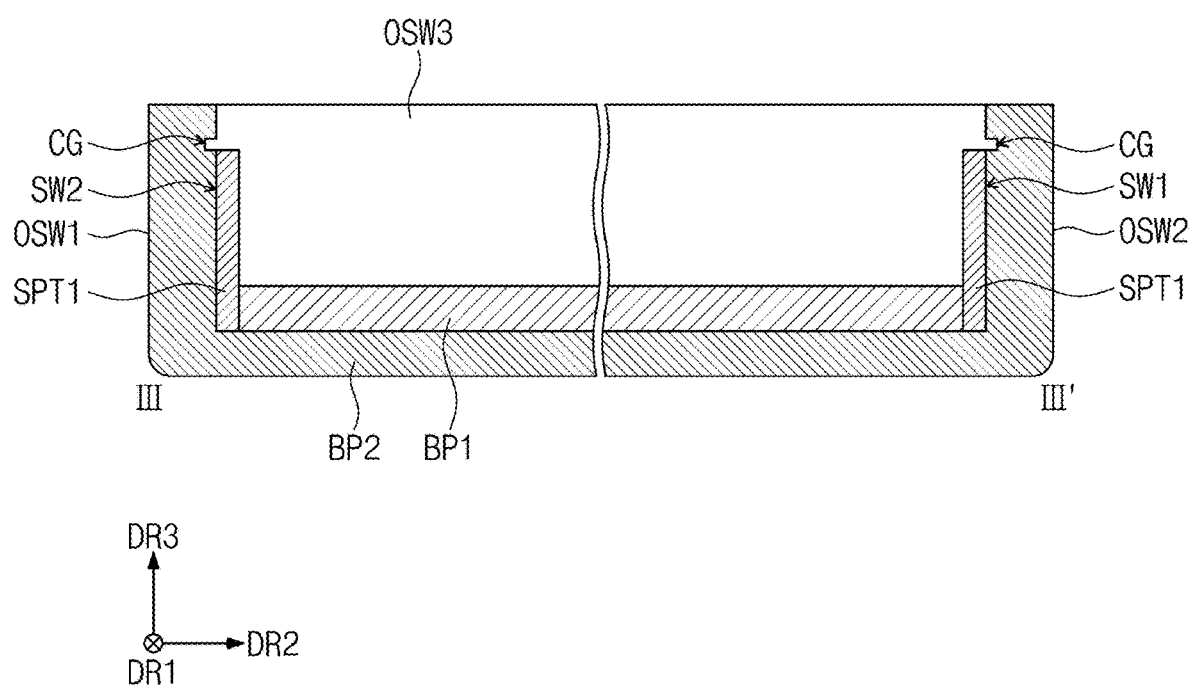
FIG. 12 is a cross-sectional view taken along line shown in FIG. 9.

FIG. 10 is a cross-sectional view taken along line I-I' shown in FIG. 9. FIG. 11 is a cross-sectional view taken along line II-II' shown in FIG. 9. FIG. 12 is a cross-sectional view taken along line shown in FIG. 9.

Referring to FIG. 10, the inner side surface of the first outer sidewall OSW1 may be one surface of the first outer sidewall OSW1, which faces the outer side surface of the first sidewall SW1. The inner side surface of the second outer sidewall OSW2 may be one surface of the second outer sidewall OSW2, which faces the outer side surface of the second sidewall SW2.

The first protrusions P1 may protrude from the inner side surfaces of the first and second outer sidewalls OSW1 and OSW2 to the first and second sidewalls SW1 and SW2. The first protrusions P1 may be adjacent to the lower portions of the first and second outer sidewalls OSW1 and OSW2, respectively. The first protrusions P1 may be respectively inserted into the second guide grooves GG2.

The second protrusions P2 may protrude from the upper portions of the first and second outer sidewalls OSW1 and OSW2 to the first and second sidewalls SW1 and SW2. The second protrusions P2 may be respectively inserted into the third guide grooves GG3.

Referring to FIG. 11, the third sidewall SW3 may have the convex curved shape. The inner side surface of the third sidewall SW3 facing the third outer sidewall OSW3 may have a curved shape that is concave. The outer side surface of the third sidewall SW3, which is opposite to the inner side surface of the third sidewall SW3, may have a convex curved shape.

The first guide groove GG1 may be more adjacent to the one side of the first sidewall SW1 (or the second sidewall SW2) than the other side of the first sidewall SW1 (or the second sidewall SW2). The first guide groove GG1 may include a first extension portion EX1, a second extension portion EX2, and a curved portion CVP. The first extension portion EX1 may extend in the first direction DR1. The second extension portion EX2 may extend in the first direction DR1 and may be disposed under the first extension portion EX1.

As an example, a length of the second extension portion EX2 in the first direction DR1 is shown to be greater than a length of the first extension portion EX1 in the first direction DR1, however, a relationship in length between the second extension portion EX2 and the first extension portion EX1 should not be limited thereto or thereby.

The curved portion CVP may extend from one side of the first extension portion EX1 to one side of the second extension portion EX2 to have a curved shape. The one side of the first extension portion EX1 and the one side of the second extension portion EX2 may be adjacent to the one side of the first case CS1 (or the third sidewall SW3). The curved portion CVP may have the convex curved shape to the one side (or the third sidewall SW3) of the first case CS1.

The roller part ROL may be disposed between the first extension portion EX1 and the second extension portion EX2. The roller part ROL may be disposed adjacent to the curved portion CVP. A portion of an outer circumferential surface of the roller part ROL may overlap an inner boundary of the curved portion CVP.

Referring to FIGS. 11 and 12, heights of the upper portions of the first and second outer sidewalls OSW1 and OSW2 may be greater than those of the first sub-portions SPT1. The connection grooves CG may be respectively defined in the first and second outer sidewalls OSW1 and OSW2. When viewed in the second direction DR2, each of the connection grooves CG may be disposed on the same line as the first extension portion EX1 without overlapping the first extension portion EX1.

The connection grooves CG may be defined in the first and second outer sidewalls OSW1 and OSW2 that do not overlap the first extension portion EX1. In an embodiment, the connection grooves CG may be defined in the portions of the first and second outer sidewalls OSW1 and OSW2 disposed higher than the first sub-portions SPT1, for example. The connection grooves CG may be adjacent to the other side of the second case CS2 (or the third outer sidewall OSW3).

Figure 13:
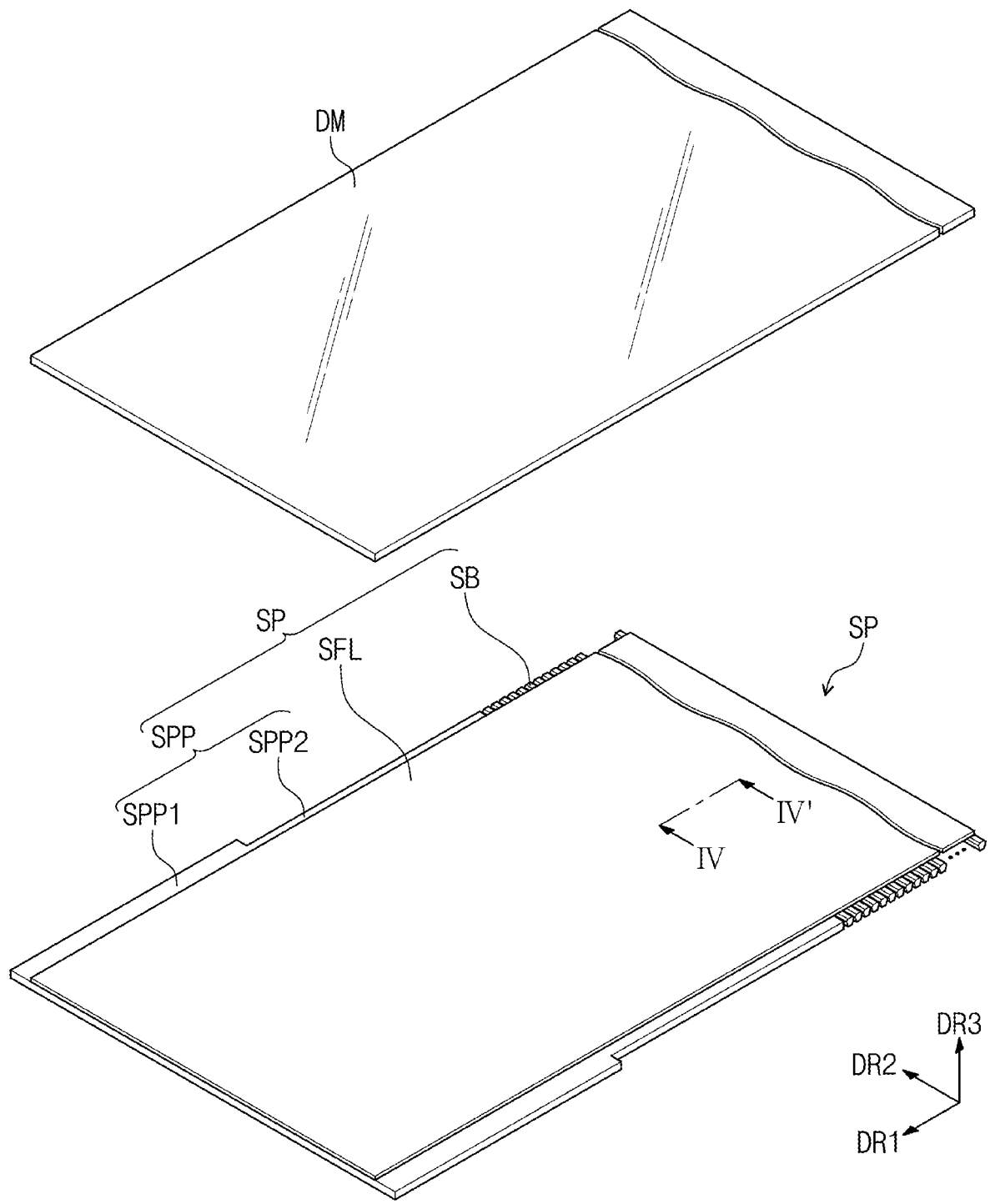
FIG. 13 is a perspective view showing a display module and a supporting part, which are to be disposed in the first case shown in FIG. 6.
Figure 14:
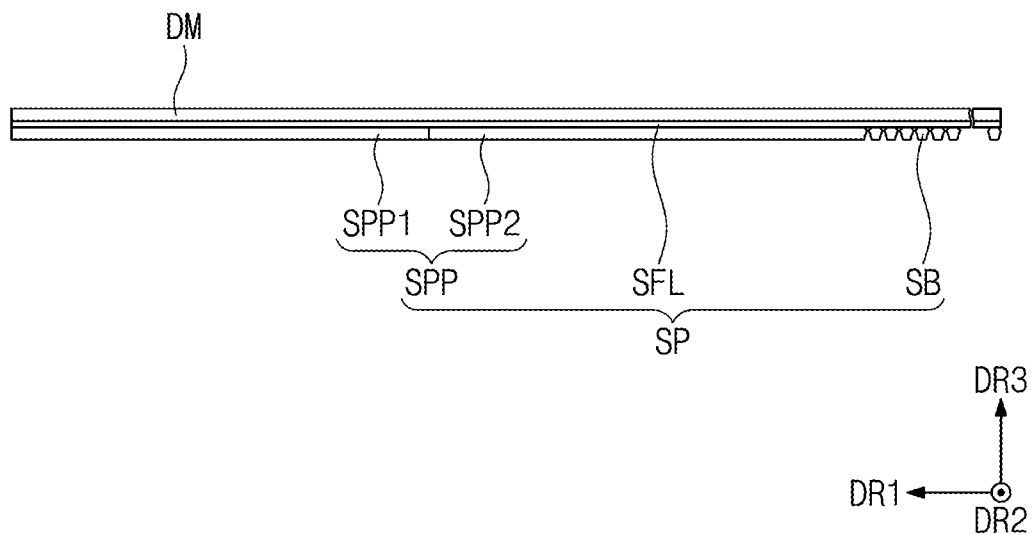
FIG. 14 is a side view showing the display module and the supporting part shown in FIG. 13 in a second direction.
Figure 15:
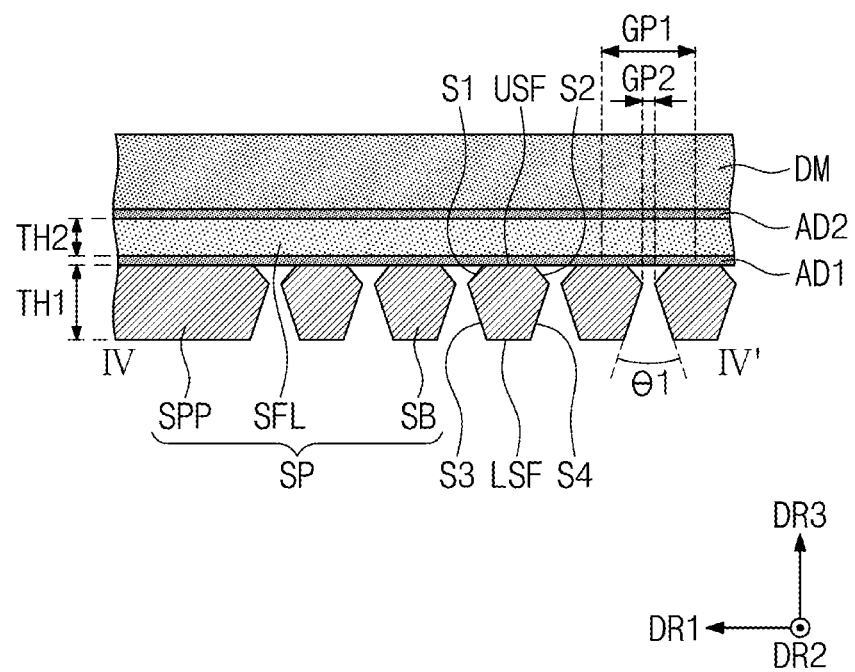
FIG. 15 is a cross-sectional view taken along line IV-IV' shown in FIG. 13.

FIG. 13 is a perspective view showing the display module DM and the supporting part SP, which are disposed in the first case shown in FIG. 6. FIG. 14 is a side view showing the display module DM and the supporting part SP shown in FIG. 13 in the second direction DR2. FIG. 15 is a cross-sectional view taken along line IV-IV' shown in FIG. 13.

For the convenience of explanation, FIG. 14 shows the coupled state of the display module DM and the supporting part SP.

Referring to FIGS. 13 and 14, the display device DD may include the supporting part SP disposed on a rear surface of the display module DM to support display module DM. The supporting part SP may include a supporting plate SPP, a plurality of supporting bars SB, and a supporting film SFL. The supporting plate SPP, the supporting bars SB, and the supporting film SFL may be disposed under the display module DM.

The supporting plate SPP and the supporting bars SB may be arranged in the first direction DR1. The supporting plate SPP may include a plane defined by the first and second directions DR1 and DR2. The supporting plate SPP may include a first supporting plate SPP1 and a second supporting plate SPP2. The second supporting plate SPP2 may be disposed between the first supporting plate SPP1 and the supporting bars SB.

A length of the first supporting plate SPP1 in the second direction DR2 may be greater than a length of the second supporting plate SPP2 in the second direction DR2 and a length of each of the supporting bars SB in the second direction DR2. The length of the second supporting plate SPP2 in the second direction DR2 may be the same as the length of each of the supporting bars SB in the second direction DR2. The supporting bars SB may extend in the second direction DR2 and may be arranged in the first direction DR1. The supporting bars SB may be spaced apart from each other in the first direction DR1.

The supporting film SFL may be disposed between the display module DM and the supporting plate SPP and between the display module DM and the supporting bars SB. A length of the supporting film SFL in the second direction DR2 may be less than the length of each of the first and second supporting plates SPP1 and SPP2 in the second direction DR2 and the length of each of the supporting bars SB in the second direction DR2.

The supporting film SFL may not overlap opposite sides of the supporting plate SPP, which are opposite to each other in the second direction DR2, and opposite sides of the supporting bars SB, which are opposite to each other in the second direction DR2, in a plan view. Opposite sides of the supporting film SFL, which are opposite to each other in the second direction DR2, may be spaced apart from the opposite sides of the supporting bars SB, which are opposite to each other in the second direction DR2. Accordingly, the opposite sides of the supporting plate SPP and the opposite sides of the supporting bars SB may be exposed without being covered by the supporting film SFL.

Referring to FIGS. 14 and 15, the supporting part SP may be attached to the rear surface of the display module DM. A first adhesive AD1 may be disposed between the supporting plate SPP and the supporting film SFL and between the supporting bars SB and the supporting film SFL. A second adhesive AD2 may be disposed between the display module DM and the supporting film SFL.

The supporting film SFL may be attached to the supporting plate SPP and the supporting bars SB by the first adhesive AD1. The display module DM may be attached to the supporting film SFL by the second adhesive AD2. The first and second adhesive AD1 and AD2 may include a pressure sensitive adhesive, however, the first and second adhesive AD1 and AD2 should not be limited thereto or thereby and may include a variety of adhesives.

The supporting film SFL may have a thickness TH2 less than a thickness TH1 of the supporting plate SPP and that of each of the supporting bars SB. The supporting film SFL may include polyimide, polyethylene terephthalate, polycarbonate, silicone, urethane or any combinations thereof. The supporting film SFL may provide a flat upper surface on a lower surface of the display module.

In an embodiment, a first gap GP1 between a center portion of a k-th supporting bar SB and a center portion of a (k+1)th supporting bar SB may be within a range from about 0.5 millimeter (mm) to about 2.0 mm, for example. Here, k may be a natural number. In an embodiment, a second gap GP2 between the k-th supporting bar SB and the (k+1)th supporting bar SB may be within a range from about 0.05 mm to about 0.5 mm, for example.

When viewed in the second direction DR2, each of the supporting bars SB may have a hexagonal shape. Each of the supporting bars SB may include an upper side USF, a lower side LSF, a first side S1, a second side S2, a third side S3, and a fourth side S4 to have the hexagonal shape.

The upper side USF may face the lower surface of the display module DM. The lower side LSF may be a side opposite to the upper side USF. The first side S1 and the second side S2 may be respectively connected to opposite ends of the upper side USF and may extend downward to define an obtuse angle with the upper side USF.

The third side S3 and the fourth side S4 may be respectively connected to opposite ends of the lower side LSF and may extend upward to define an obtuse angle with the lower side LSF. The third side S3 may be connected to an end of the first side S1. The fourth side S4 may be connected to an end of the second side S2.

A length of the upper side USF in the first direction DR1 may be greater than a length of the lower side LSF in the first direction DR1. Among the supporting bars SB, an angle θ1 defined by a fourth side S4 of the k-th supporting bar SB and a third side S3 of the (k+1)th supporting bar SB may be within a range from about 30 degrees to about 60 degrees, for example.

When the supporting film SFL is not used, the display module DM may be disposed on the supporting bars SB. In this case, as the supporting bars SB are spaced apart from each other, the display module DM may be sagged downward between the supporting bars SB. Accordingly, a flatness (surface quality) of the display module DM may be lowered.

However, in the embodiment of the invention, the supporting film SFL may be disposed between the supporting bars SB and the display module DM, and the supporting film SFL may provide a flat upper surface under the display module DM. The display module DM may maintain its flat state by the supporting film SFL. Thus, the surface quality of the display module DM may be improved.

Figure 16:
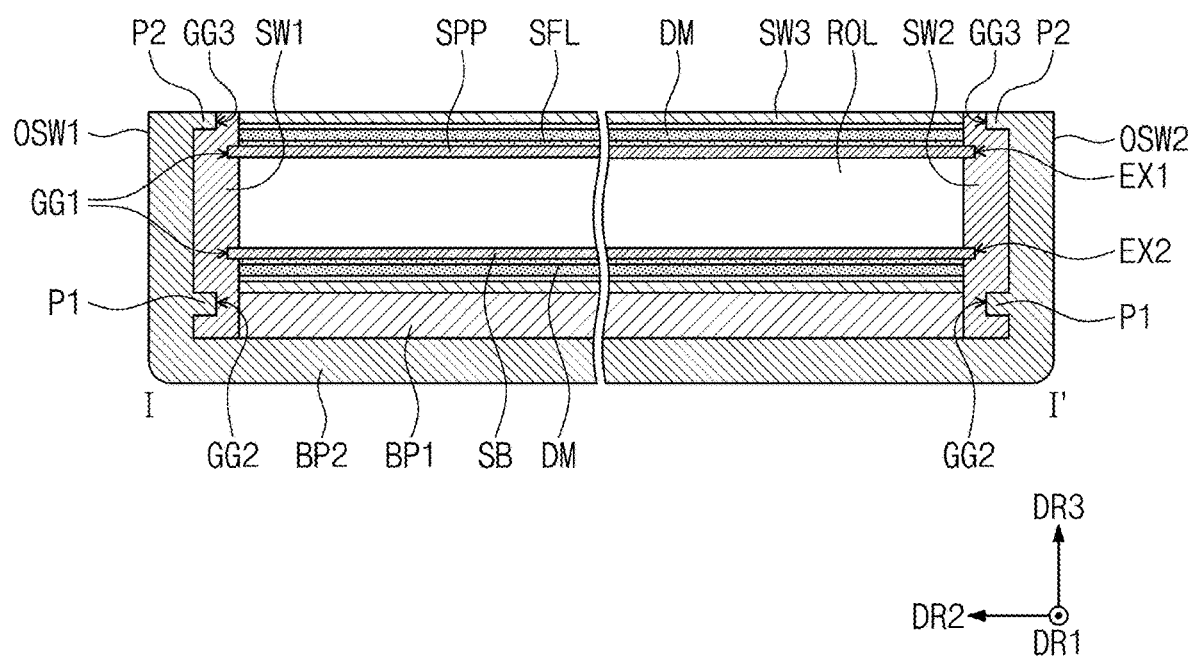
FIGS. 16, 17, and 18 are cross-sectional views showing a display module and a supporting part, which are disposed in the first and second cases.
Figure 17:
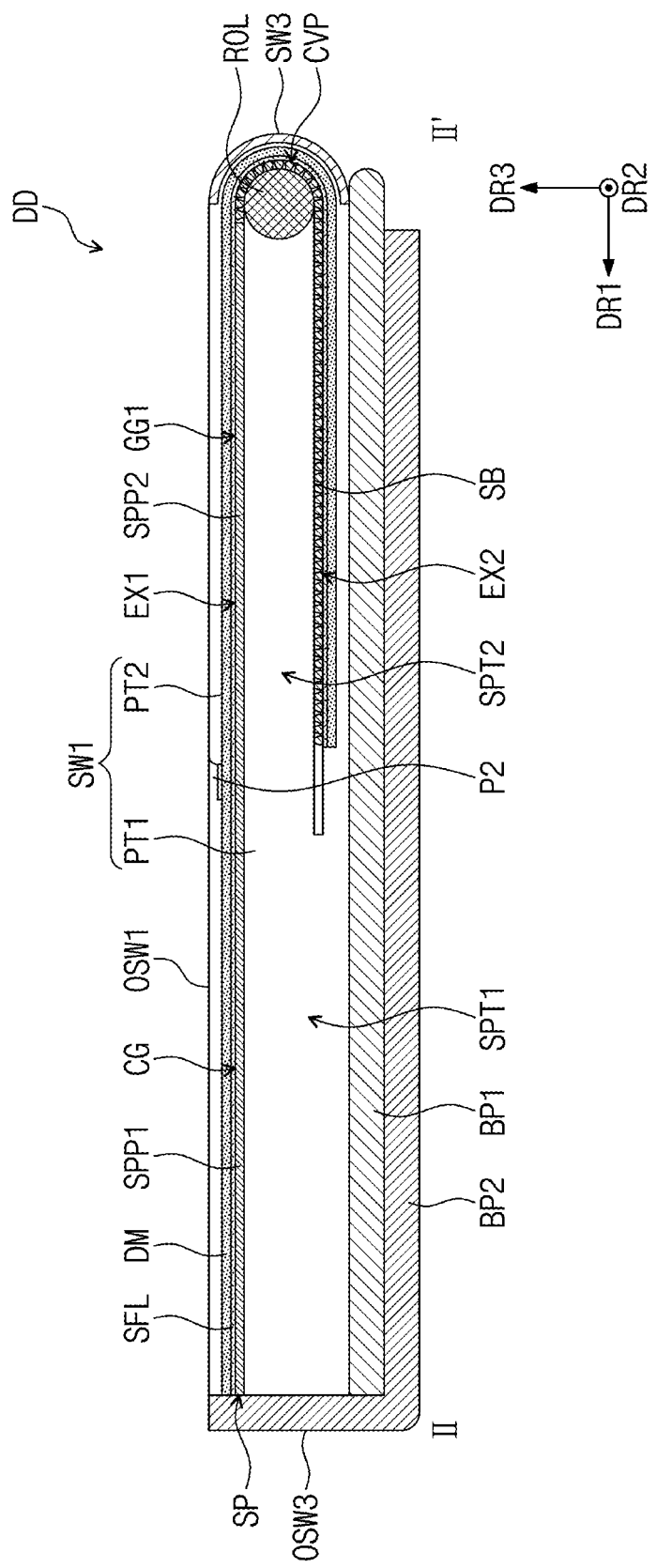
Figure 18:
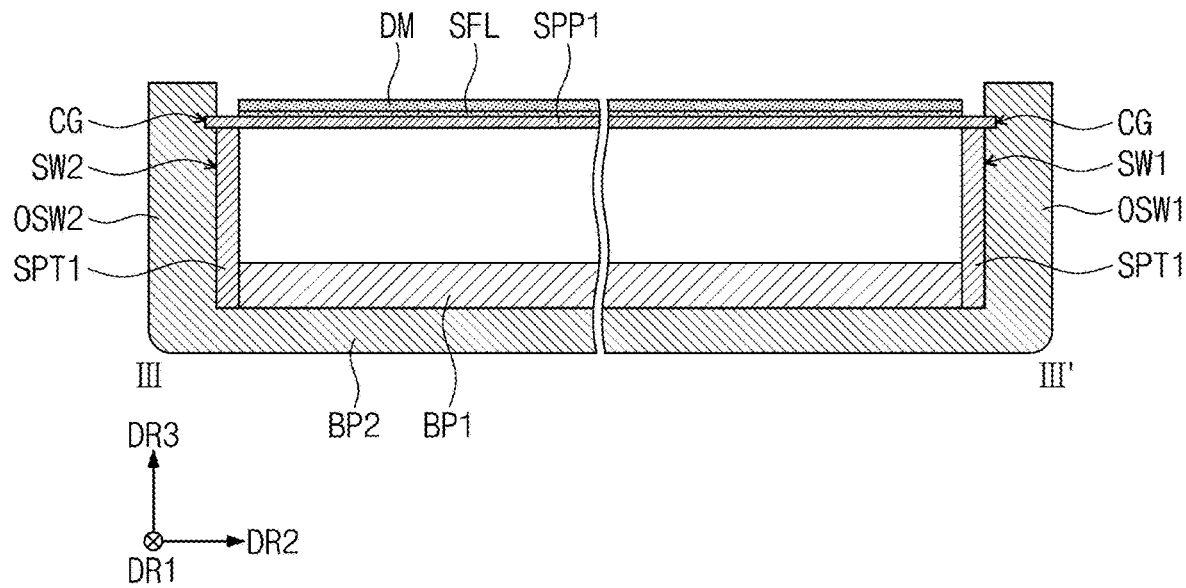
Figure 19:
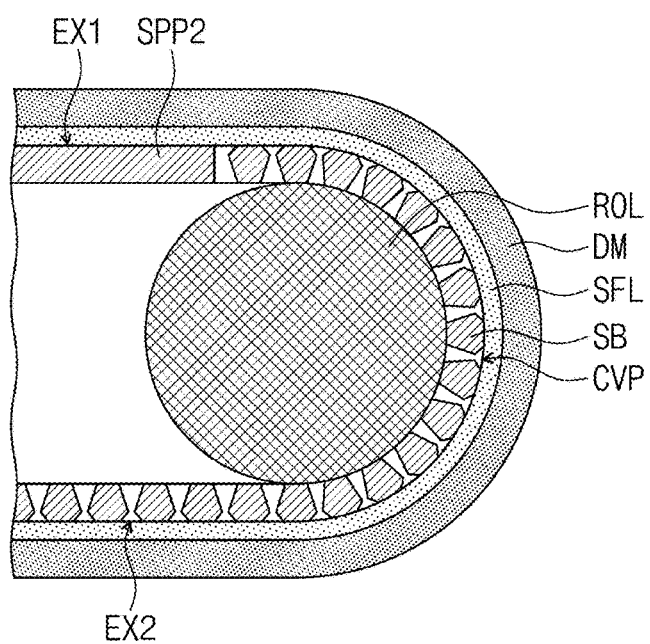
FIG. 19 is an enlarged view showing supporting bars and a roller part, which are disposed at a curved portion shown in FIG. 17.

FIGS. 16, 17, and 18 are cross-sectional views showing the display module and the supporting part, which are disposed in the first and second cases. FIG. 19 is an enlarged view showing the supporting bars and the roller part, which are disposed at the curved portion shown in FIG. 17.

FIG. 16 is a cross-sectional view substantially corresponding to FIG. 10, FIG. 17 is a cross-sectional view substantially corresponding to FIG. 11, and FIG. 18 is a cross-sectional view substantially corresponding to FIG. 12.

Referring to FIGS. 16 and 17, a portion of a front surface of the display module DM adjacent to an edge of the first case CS1 may be exposed to the outside by the opening OP shown in FIG. 1. The front surface of the display module DM may be an image display surface. The supporting part SP may be connected to the second case CS2, and the opposite sides of the supporting part SP, which are opposite to each other in the second direction DR2, may move in the first direction DR1 after being respectively inserted into the first guide grooves GG1.

Referring to FIGS. 17 and 18, the supporting plate SPP may be connected to the second case CS2. In an embodiment, the opposite sides of the first supporting plate SPP1, which are opposite to each other in the second direction DR2, may be respectively inserted into the connection grooves CG and may be connected to the second case CS2, for example. Predetermined portions of the first supporting plate SPP1, which are adjacent to the opposite sides of the first supporting plate SPP1, may be disposed on the first sub-portions SPT1 of the first and second sidewalls SW1 and SW2.

Referring to FIGS. 16 and 17, a length of the display module DM in the second direction DR2 may be less than a length of the second supporting plate SPP2 in the second direction DR2. Since the length of the second supporting plate SPP2 is substantially the same as the length of each of the supporting bars SB, the length of the display module DM in the second direction DR2 may be less than the length of each of the supporting bars SB in the second direction DR2.

The display module DM and the supporting film SFL may not be inserted into the first guide grooves GG1. The display module DM and the supporting film SFL may be disposed between the first sidewall SW1 and the second sidewall SW2.

The state of the display device DD shown in FIG. 17 may be the basic mode of the display device DD. In the basic mode of the display device DD, the opposite sides of the supporting plate SPP may be disposed at the first extension portions EX1. In an embodiment, the opposite sides of the second supporting plate SPP2, which are opposite to each other in the second direction DR2, may be respectively inserted into and disposed at the first extension portions EX1, for example. In the basic mode of the display device DD, the opposite sides of the supporting bars SB, which are opposite to each other in the second direction DR2, may be respectively inserted into and disposed at the second extension portions EX2 and the curved portions CVP.

The display module DM and the supporting film SFL may be accommodated in the first and second cases CS1 and CS2 while being folded along the curved portion CVP due to the arrangement of the supporting part SP described above. In an embodiment, a portion of the display module DM and a portion of the supporting film SFL, which are on the supporting bars SB disposed on the curved portion CVP, may be folded, for example. The portion of the display module DM, which is disposed on the supporting plate SPP, may be exposed to the outside through the opening OP shown in FIG. 1, and the portion of the display module DM, which is disposed on the supporting bars SB, may not be exposed to the outside.

Referring to FIGS. 17 and 19, the roller part ROL may rotate to allow the supporting bars SB disposed on the curved portion CVP to move. In an embodiment, an outer circumferential surface of the roller part ROL may be in contact with lower surfaces of the supporting bars SB, for example. When the roller part ROL rotates, the supporting bars SB may move due to a frictional force. The roller part ROL may include a rubber.

Figure 20:
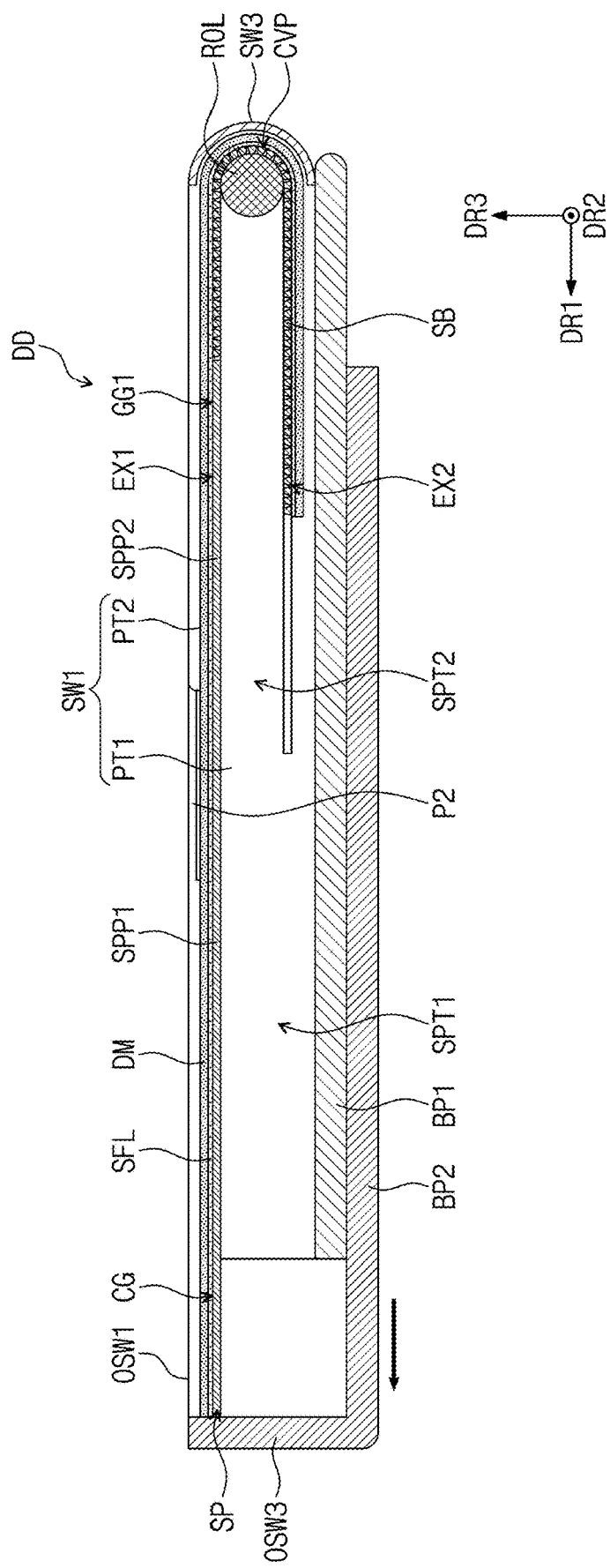
FIG. 20 is a view showing an expanding mode of the display device shown in FIG. 17.

FIG. 20 is a view showing the expanding mode of the display device DD shown in FIG. 17.

Referring to FIG. 20, when the second case CS2 moves in the first direction DR1 to be far away from the first case CS1 for the expanding mode of the display device DD, the supporting part SP may move along the first guide groove GG1. The first supporting plate SPP1 may be connected to the second case CS2 to move in the first direction DR1 along the second case CS2, and the second supporting plate SPP2 and the supporting bars SB may move along the first guide groove GG1. The roller part ROL may rotate to allow the supporting bars SB to move along the first guide groove GG1.

The second case CS2 may move in various ways. In an embodiment, the second case CS2 may move by a driver (not shown) that rotates the roller part ROL, for example. The roller part ROL may rotate in a clockwise direction or a counter-clockwise direction by the driver, and the supporting bars SB may move by the roller part ROL. In addition, the second case CS2 may move by the user's own force. The expanded area of the display module DM may be determined according to the movement amount of the second case CS2.

In the expanding mode, some supporting bars SB among the supporting bars SB may move along the curved portion CVP and may be disposed on a portion of the first extension portion EX1 adjacent to the curved portion CVP. The supporting bars SB disposed on the first extension portion EX1 may support the display module DM. The supporting film SFL may be disposed under the display module DM, may support the display module DM, and may maintain the flat state of the display module DM.

Consequently, the display device DD in the embodiment may improve the surface quality of the display module DM.

FIGS. 21 to 26 are views showing an embodiment of a method of manufacturing the supporting part SP according to the invention.

Figure 21:
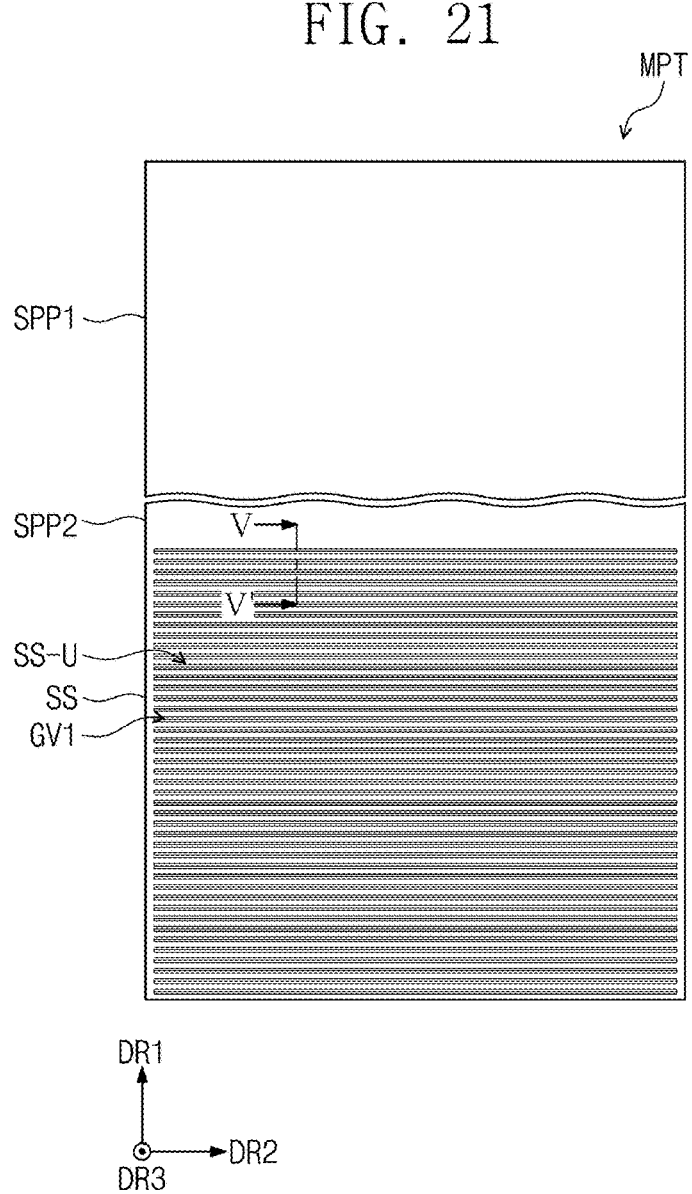
FIGS. 21 to 26 are views showing an embodiment of a method of manufacturing a supporting part according to the invention.
Figure 22:
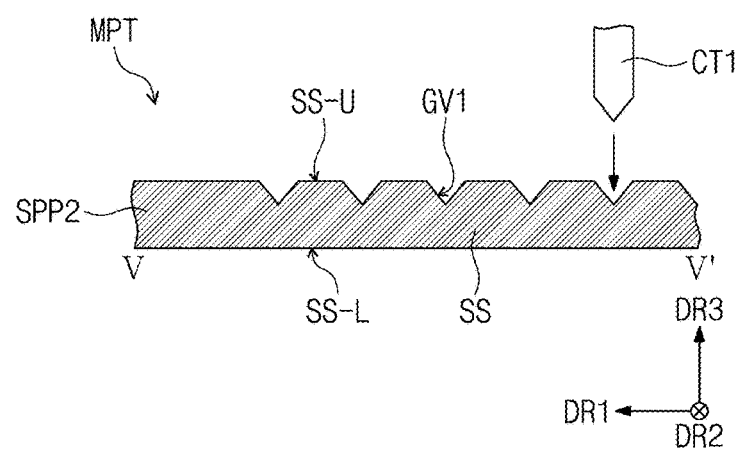
Figure 24:
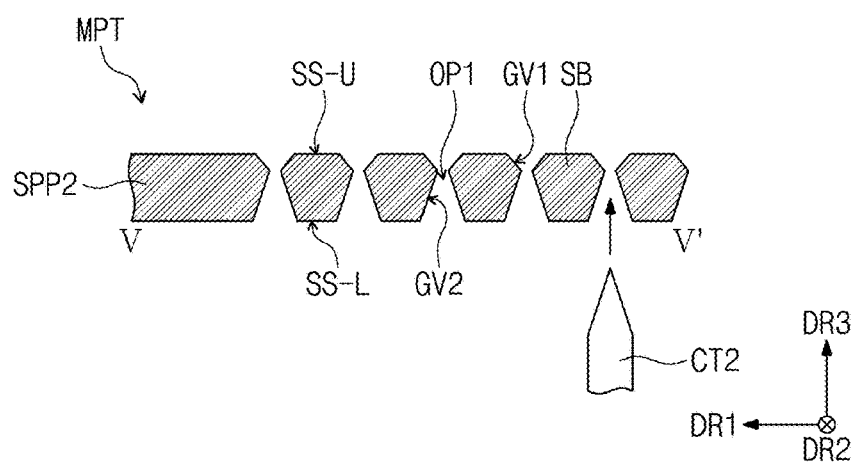
Figure 26:
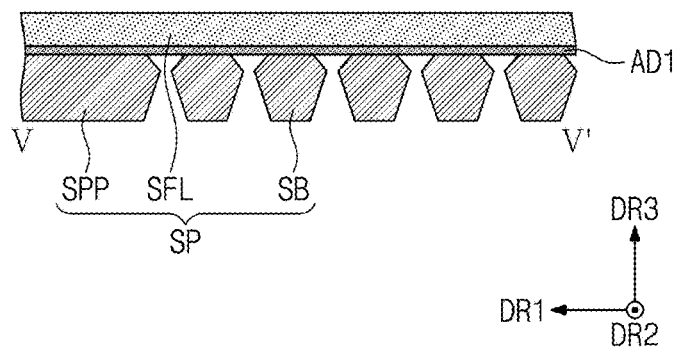

FIG. 22 is a cross-sectional view taken along line V-V' shown in FIG. 21, and FIGS. 24 and 26 are cross-sectional views corresponding to FIG. 22.

Referring to FIGS. 21 and 22, a metal plate MPT including the first supporting plate SPP1, the second supporting plate SPP2, and a sub-supporting plate SS may be prepared. The first supporting plate SPP1, the second supporting plate SPP2, and the sub-supporting plate SS may be arranged in the first direction DR1.

First grooves GV1 may be defined in an upper surface SS-U of the sub-supporting plate SS by a first cutting tool CT1. The first grooves GV1 may be arranged in the first direction DR1 and may extend in the second direction DR2. When viewed in the second direction DR2, the first grooves GV1 may have a V shape.

A length of each of the first grooves GV1 in the second direction DR2 may be less than a length of the sub-supporting plate SS in the second direction DR2, and the first grooves GV1 may not be defined to opposite sides of the sub-supporting plate SS. That is, the first grooves GV1 may be spaced apart from the opposite sides of the sub-supporting plate SS, which are opposite to each other in the second direction DR2.

Figure 23:
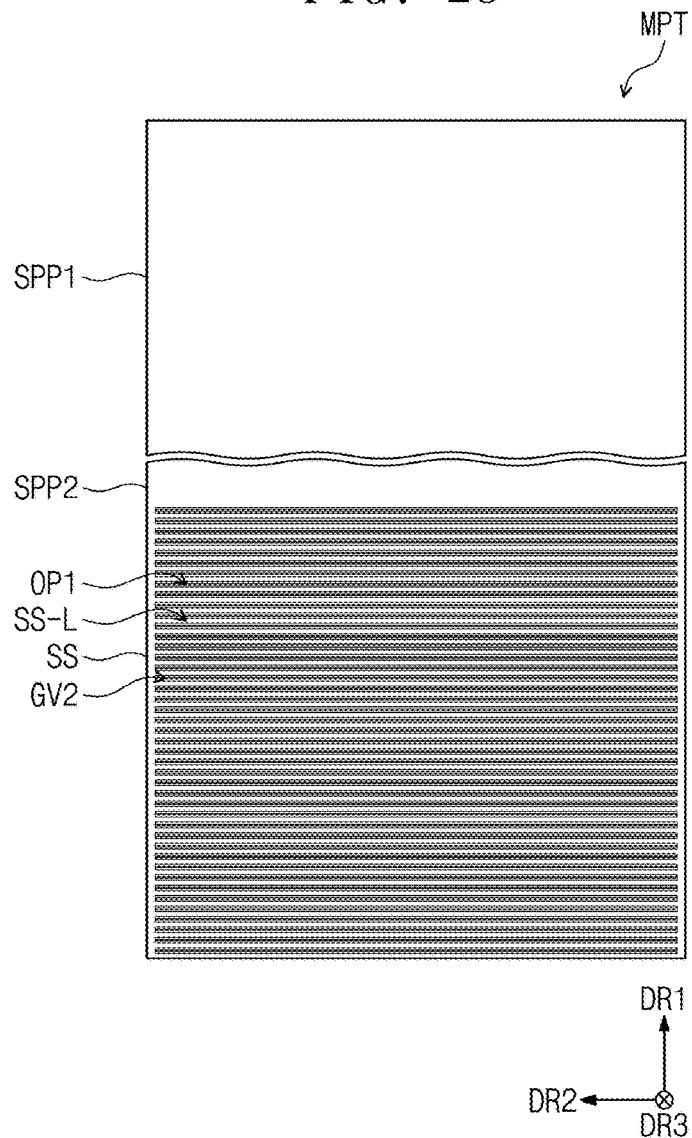

Referring to FIGS. 23 and 24, second grooves GV2 may be defined in a lower surface SS-L of the sub-supporting plate SS, which is opposite to the upper surface SS-U of the sub-supporting plate SS, by a second cutting tool CT2. The second grooves GV2 may be arranged in the first direction DR1 and may extend in the second direction DR2.

A length of each of the second grooves GV2 in the second direction DR2 may be less than the length of the sub-supporting plate SS in the second direction DR2, and the second grooves GV2 may not be defined to opposite sides of the sub-supporting plate SS. That is, the second grooves GV2 may be spaced apart from the opposite sides of the sub-supporting plate SS, which are opposite to each other in the second direction DR2. Each of the second grooves GV2 may be greater than each of the first grooves GV1.

The second grooves GV2 may overlap the first grooves GV1. The second grooves GV2 may be defined from the lower surface SS-L of the sub-supporting plate SS to the first grooves GV1, and as a result, openings OP1 may be defined in the sub-supporting plate SS by the first and second grooves GV1 and GV2. Consequently, the supporting bars SB between the openings OP1 may be defined in the sub-supporting plate SS. The openings OP1 may be arranged in the first direction DR1 and may extend in the second direction DR2.

Figure 25:
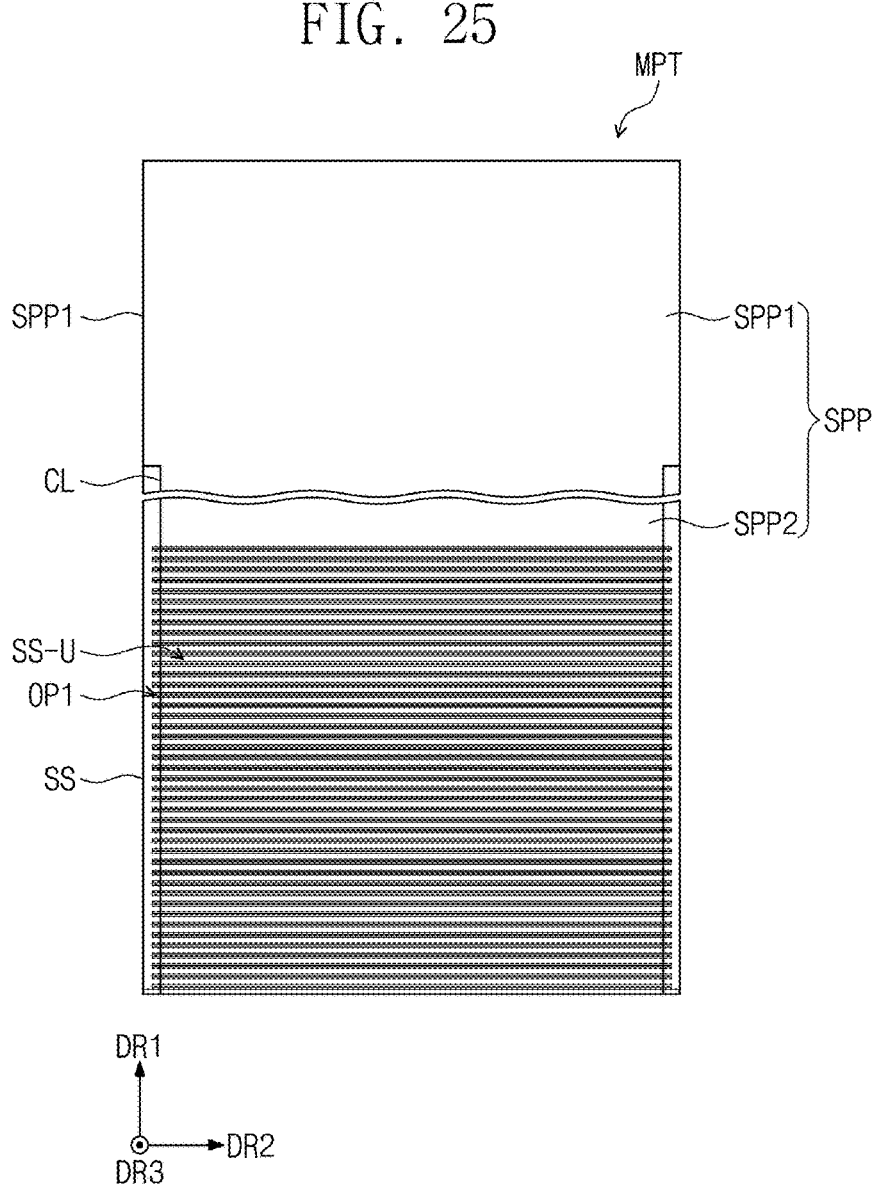

Referring to FIG. 25, cutting lines CL may be defined in the metal plate MPT. The cutting lines CL may be spaced apart from the opposite sides of the second supporting plate SPP2, which are opposite to each other in the second direction DR2, and the opposite sides of the sub-supporting plate SS, which are opposite to each other in the second direction DR2, and may extend in the first direction DR1 via the openings OP1. The cutting lines CL may extend in the second direction DR2 toward the both sides of the second supporting plate SPP2 at a boundary between the first supporting plate SPP1 and the second supporting plate SPP2.

As the metal plate MPT is cut along the cutting lines CL, the supporting bars SB between the openings OP1 may be separated from the sub-supporting plate SS. Portions from the cutting lines CL to the opposite sides of the sub-supporting plate SS and portions from the cutting lines CL to the opposite sides of the second supporting plate SPP2 may be removed since they are dummy portions.

After the cutting process, portions of the metal plate MPT, which remain between the cutting lines CL, may be the second supporting plate SPP2 and the supporting bars SB of the supporting part SP shown in FIG. 13. The first supporting plate SPP1 may be the first supporting plate SPP1 shown in FIG. 13

Referring to FIG. 26, the supporting film SFL may be provided on the supporting plate SPP including the supporting bars SB and the first and second supporting plates SPP1 and SPP2. The first adhesive AD1 may be disposed between the supporting film SFL and the supporting plate SPP and between the supporting film SFL and the supporting bars SB. The supporting film SFL may be attached to the supporting plate SPP and the supporting bars SB by the first adhesive AD1, and thus, the supporting part SP in the embodiment of the invention may be manufactured.

FIGS. 27 to 30 are views showing another embodiment of a method of manufacturing a supporting part according to the invention.

Figure 27:
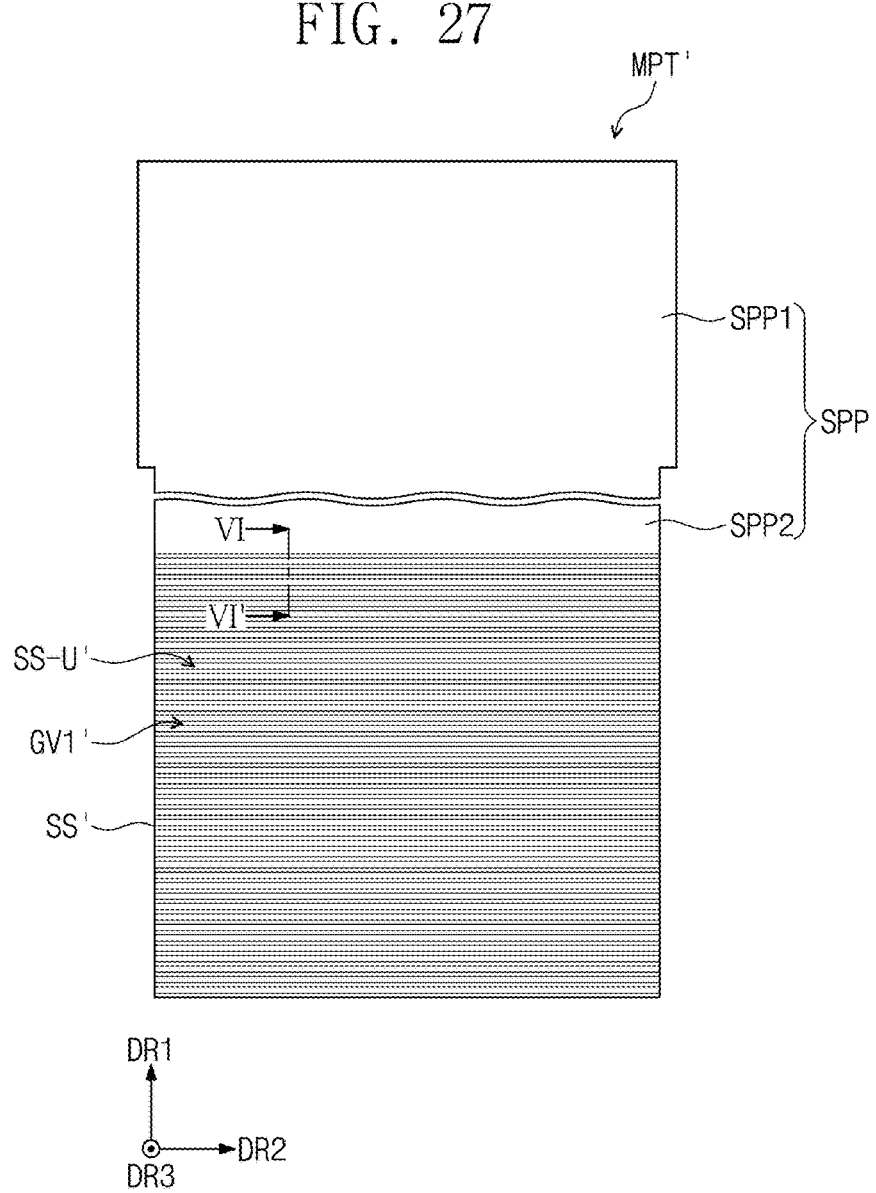
FIGS. 27 to 30 are views showing another embodiment of a method of manufacturing a supporting part according to the invention.
Figure 28:
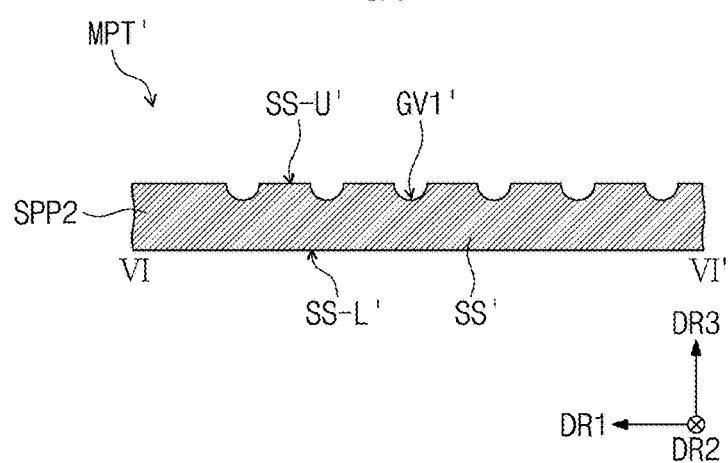
Figure 29:
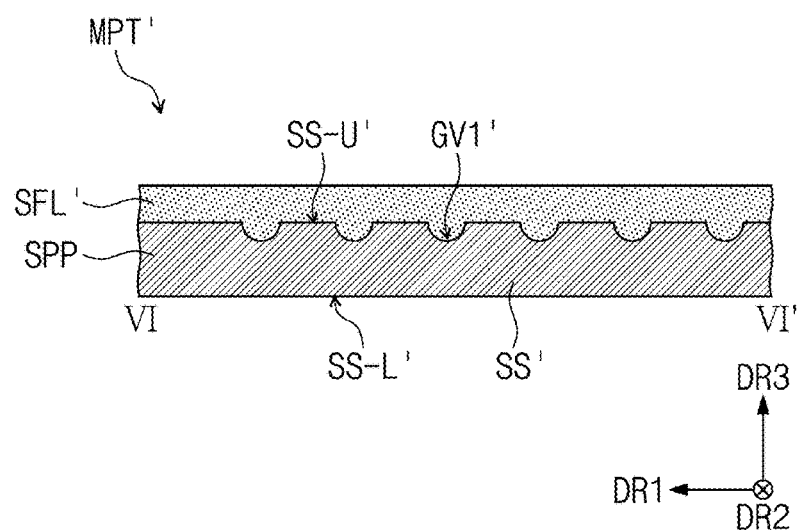
Figure 30:
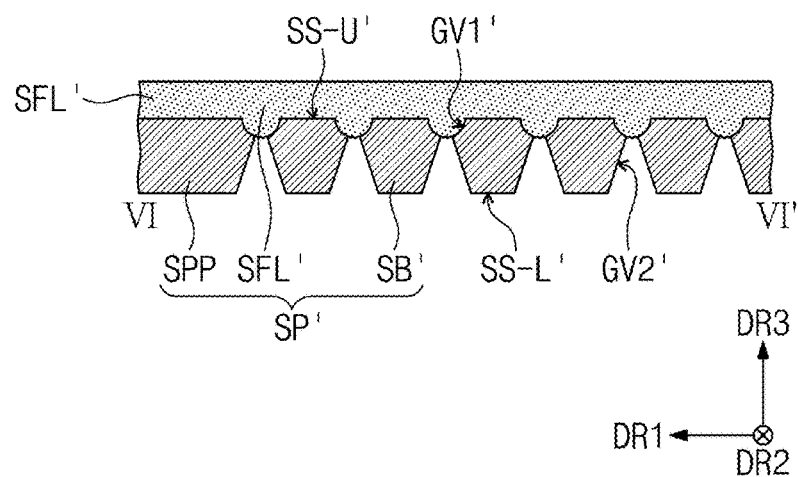

FIG. 28 is a cross-sectional view taken along line VI-VI' shown in FIG. 27, and FIGS. 29 and 30 are cross-sectional views corresponding to FIG. 28.

Referring to FIGS. 27 and 28, a metal plate MPT' including a supporting plate SPP and a sub-supporting plate SS' that are arranged in the first direction DR1 may be prepared. The supporting plate SPP may include a first supporting plate SPP1 and a second supporting plate SPP2. The first supporting plate SPP1 and the second supporting plate SPP2 may be substantially the same as the first supporting plate SPP1 and the second supporting plate SPP2 shown in FIG. 13.

First grooves GV1' may be defined in an upper surface SS-U' of the sub-supporting plate SS'. The first grooves GV1' may be arranged in the first direction DR1 and may extend in the second direction DR2. When viewed in the second direction DR2, the first grooves GV1' may have a concave curved shape. The first grooves GV1' may be defined to opposite sides of the sub-supporting plate SS', which are opposite to each other in the second direction DR2.

Referring to FIG. 29, a supporting layer SFL' may be disposed on the upper surface SS-U' of the sub-supporting plate SS' and the first grooves GV1'. The supporting layer SFL' may provide a flat surface on a lower portion of a display module DM, like the supporting film SFL. The supporting layer SFL' may include silicone. The supporting layer SFL' may be disposed on the supporting plate SPP.

Referring to FIG. 30, second grooves GV2' may be defined in a lower surface SS-L' of the sub-supporting plate SS', which is opposite to the upper surface SS-U' of the sub-supporting plate SS'. The second grooves GV2' may be arranged in the first direction DR1 and may extend in the second direction DR2. Each of the second grooves GV2' may be greater than each of the first grooves GV1'.

The second grooves GV2' may overlap the first grooves GV1'. The second grooves GV2' may be defined to the opposite sides of the sub-supporting plate SS', which are opposite to each other in the second direction DR2, like the first grooves GV1'. The second grooves GV2' may be defined from the lower surface SS-L' of the sub-supporting plate SS' to the first grooves GV1'. As a result, supporting bars SB' are provided between the first grooves GV1' and between the second grooves GV2', and the supporting part SP' including the supporting plate SPP, the supporting layer SFL', and the supporting bars SB' may be manufactured.

Although the embodiments of the invention have been described, it is understood that the invention should not be limited to these embodiments but various changes and modifications may be made by one ordinary skilled in the art within the spirit and scope of the invention as hereinafter claimed. Therefore, the disclosed subject matter should not be limited to any single embodiment described herein.

What is claimed is:

1. A display device comprising:
a display module;
a supporting plate disposed under the display module;

a plurality of supporting bars disposed under the display module and arranged in a first direction with the supporting plate;

a supporting film disposed between the display module and the supporting plate and between the display module and the plurality of supporting bars;

a first case accommodating the display module, the supporting plate, the supporting film, and the plurality of supporting bars; and a second case which is coupled to the first case and moves along the first direction, wherein opposite sides of the plurality of supporting bars are respectively inserted into first guide grooves defined in inner side surfaces of the first case, which face each other in a second direction crossing the first direction, and the plurality of supporting bars moves along the first guide grooves.

2. The display device of claim 1, wherein the supporting film has a thickness less than the supporting plate and the plurality of supporting bars.

3. The display device of claim 1, wherein the supporting film comprises polyimide, polyethylene terephthalate, polycarbonate, silicone, or urethane.

4. The display device of claim 1, further comprising an adhesive which attaches the supporting film to the supporting plate and the plurality of supporting bars.

5. The display device of claim 1, wherein the plurality of supporting bars are arranged in the first direction, spaced apart from each other and extend in the second direction.

6. The display device of claim 5, wherein, in the second direction, each of the plurality of supporting bars comprises:
an upper side facing a rear surface of the display module;
a lower side opposite to the upper side;
a first side and a second side, which are respectively connected to opposite ends of the upper side and define an obtuse angle with the upper side and extend downward; and
a third side and a fourth side, which are respectively connected to opposite ends of the lower side, define an obtuse angle with the lower side, extend upward, and are respectively connected to an end of the first side and an end of the second side.

7. The display device of claim 6, wherein a length of the upper side in the first direction is greater than a length of the lower side in the first direction, and an angle defined by a fourth side of a k-th supporting bar and a third side of a (k+1)th supporting bar facing the fourth side of the k-th supporting bar among the plurality of supporting bars is within a range from about 30 degrees to about 60 degrees where k is a natural number.

8. The display device of claim 1, wherein each of the first guide grooves comprises:
a first extension portion extending in the first direction;
a second extension portion extending in the first direction and disposed under the first extension portion; and
a curved portion extending from one side of the first extension portion to one side of the second extension portion, wherein the one side of each of the first and second extension portions is adjacent to one side of the first case among opposite sides of the first case, which are opposite to each other in the first direction, and the curved portion has a convex curved shape to the one side of the first case.

9. The display device of claim 8, wherein the supporting plate is connected to the second case, opposite sides of the supporting plate are inserted into the first extension portions of the first guide grooves, and the opposite sides of the plurality of supporting bars are inserted into the curved portions and the second extension portions of the first guide grooves.

10. The display device of claim 9, wherein, when the second case moves far away from the first case in the first direction, some supporting bars among the plurality of supporting bars move along the curved portions and are disposed in parts of the first extension portions adjacent to the curved portions.

11. The display device of claim 8, further comprising a roller part extending in the second direction in the first case, disposed between the first extension portion and the second extension portion and adjacent to the curved portions, wherein the roller part is in contact with the plurality of supporting bars when rotating.

12. The display device of claim 8, wherein the supporting plate comprises:
a first supporting plate connected to the second case; and
a second supporting plate disposed between the first supporting plate and the plurality of supporting bars,
wherein opposite sides of the second supporting plate are inserted into the first extension portions of the first guide grooves, and a length of the first supporting plate in the second direction is greater than a length of the second supporting plate in the second direction.

13. The display device of claim 12, wherein opposite sides of the first supporting plates are inserted into connection grooves defined in inner side surfaces of the second case, which face each other in the second direction, and in the second direction, the connection grooves do not overlap the first extension portions of the first guide grooves.

14. The display device of claim 8, wherein the first case comprises:
a first sidewall extending in the first direction;
a second sidewall extending in the first direction and facing the first sidewall in the second direction;
a third sidewall disposed between one side of the first sidewall and one side of the second sidewall and defining the one side of the first case; and
a first bottom portion connected to lower portions of the first, second, and third sidewalls, and the first guide grooves are defined in an inner side surface of the first sidewall and an inner side surface of the second sidewall, which face each other.

15. The display device of claim 14, wherein the supporting film and the display module are disposed between the first sidewall and the second sidewall without being inserted into the first guide grooves.

16. The display device of claim 14, wherein the second case comprises:
a first outer sidewall disposed on an outer side surface of the first sidewall;
a second outer sidewall disposed on an outer side surface of the second sidewall;
a third outer sidewall facing the third sidewall and disposed between the first outer sidewall and the second outer sidewall;
a second bottom portion disposed under the first bottom portion; and
first protrusions respectively protruding from an inner side surface of the first outer sidewall and an inner side surface of the second outer sidewall, which face each other, and extending in the first direction,
wherein the first protrusions are inserted into second guide grooves defined in the outer side surface of the first sidewall and the outer side surface of the second sidewall and extending in the first direction.

17. The display device of claim 16, wherein the second case further comprises second protrusions respectively protruding from an upper portion of the first outer sidewall and an upper portion of the second outer sidewall toward the first sidewall and the second sidewall and extending in the first direction, and the second protrusions are inserted into third guide grooves defined in an upper portion of the first sidewall and an upper portion of the second sidewall and extending in the first direction.

* * * * *